United States Patent [19]

Kusumoto et al.

[11] Patent Number: 5,089,859
[45] Date of Patent: Feb. 18, 1992

[54] MULTICOLOR IMAGE FORMING APPARATUS WHICH CONVERTS COLOR DATA INTO ERASING DATA

[75] Inventors: Keiji Kusumoto; Kenzo Nagata, both of Osaka, Japan

[73] Assignee: Minolta Camera Kabushiki Kaisha, Osaka, Japan

[21] Appl. No.: 379,828

[22] Filed: Jul. 14, 1989

[30] Foreign Application Priority Data

| Jul. 16, 1988 | [JP] | Japan | 63-177550 |
| Jul. 16, 1988 | [JP] | Japan | 63-177551 |
| Jul. 16, 1988 | [JP] | Japan | 63-177552 |
| Jul. 16, 1988 | [JP] | Japan | 63-177553 |
| Jul. 16, 1988 | [JP] | Japan | 63-177554 |
| Jul. 16, 1988 | [JP] | Japan | 63-177555 |
| Jul. 16, 1988 | [JP] | Japan | 63-177556 |
| Jul. 16, 1988 | [JP] | Japan | 63-177557 |
| Feb. 13, 1989 | [JP] | Japan | 64-33103 |
| Feb. 13, 1989 | [JP] | Japan | 64-33104 |

[51] Int. Cl.⁵ .................... G03G 15/01
[52] U.S. Cl. .................... 355/327; 355/218; 430/42
[58] Field of Search .......... 355/218, 326–328; 430/42–44; 358/75, 80

[56] References Cited

U.S. PATENT DOCUMENTS 4,336,994 6/1982 Banton .................... 355/327
4,591,905 5/1986 Noguchi .................... 358/75

FOREIGN PATENT DOCUMENTS 60-194469 10/1985 Japan.
62-99769 5/1987 Japan.

Primary Examiner—Joan H. Pendegrass
Attorney, Agent, or Firm—Burns, Doane, Swecker & Mathis

[57] ABSTRACT

A color image forming apparatus providing an image reader comprised of an array of image reading devices aligned in a main scan direction and an editing eraser comprised of an array of light emitting devices each of which has a size different from that of each image reading device is disclosed. In the color image forming apparatus, a lump of image data obtained by the image reader are converted to a data suitable for erasing in a predetermined manner in which numbers of individual color data and ranks of priority of them are taking into consideration.

20 Claims, 36 Drawing Sheets

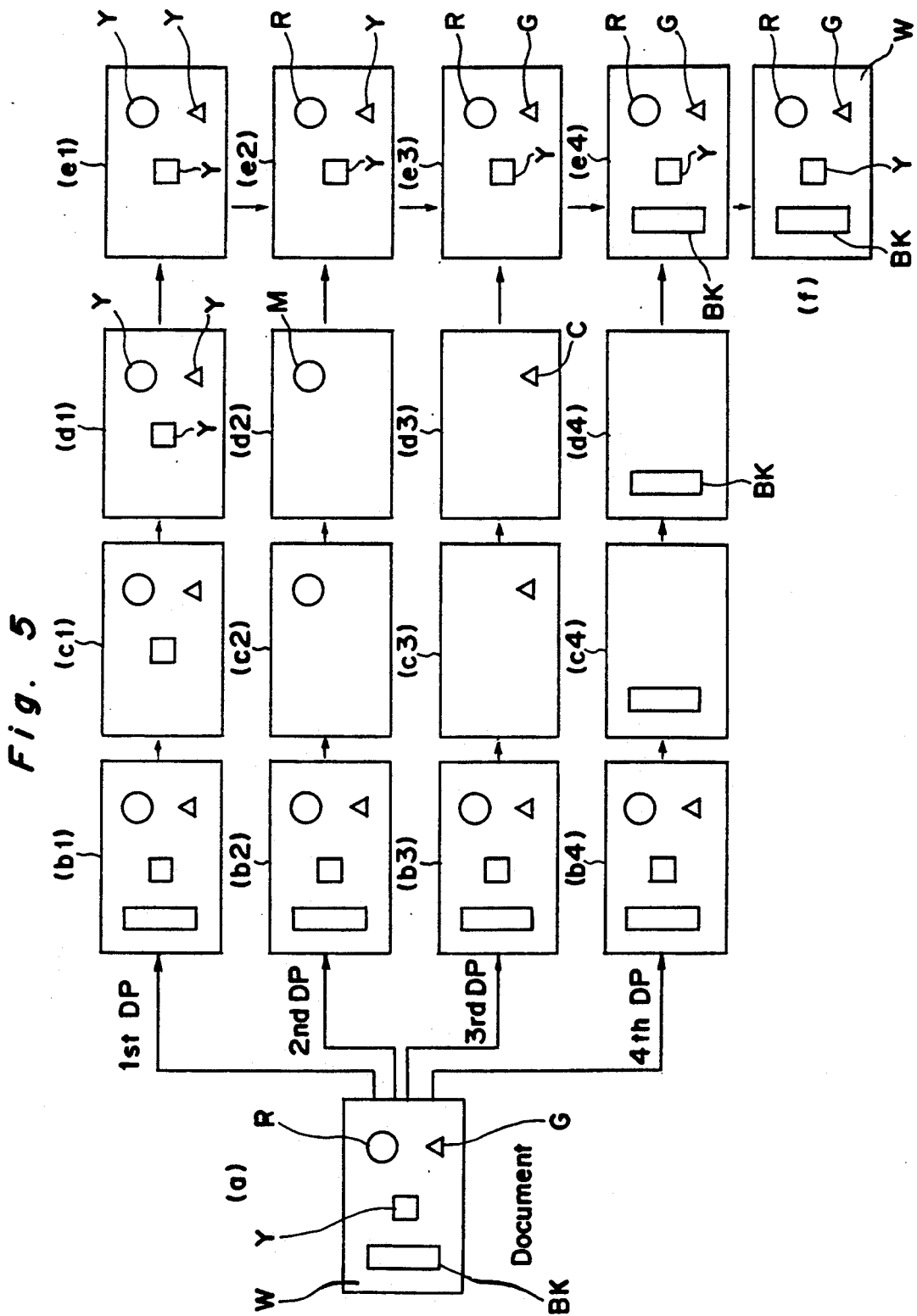

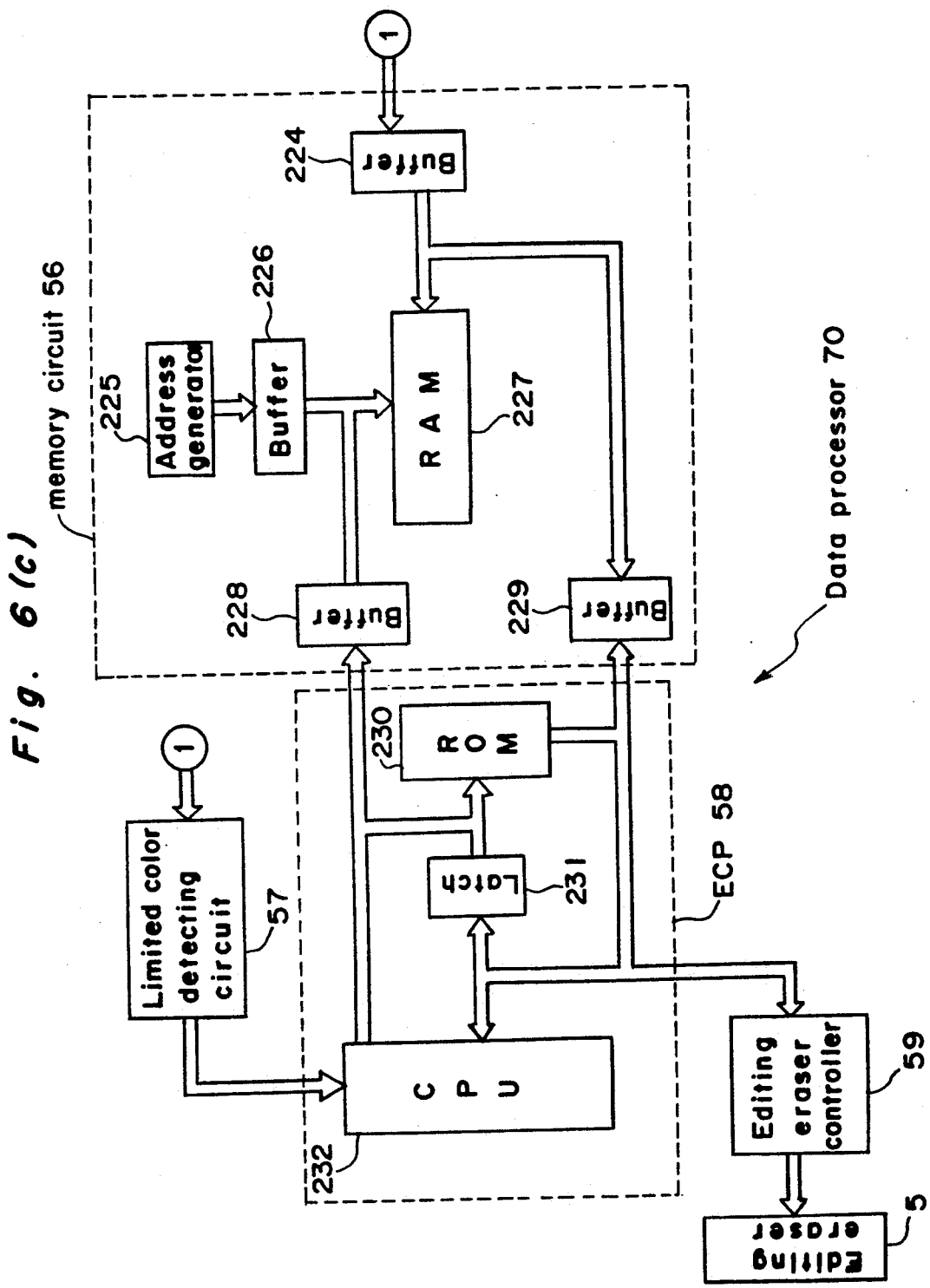

Fig. 7
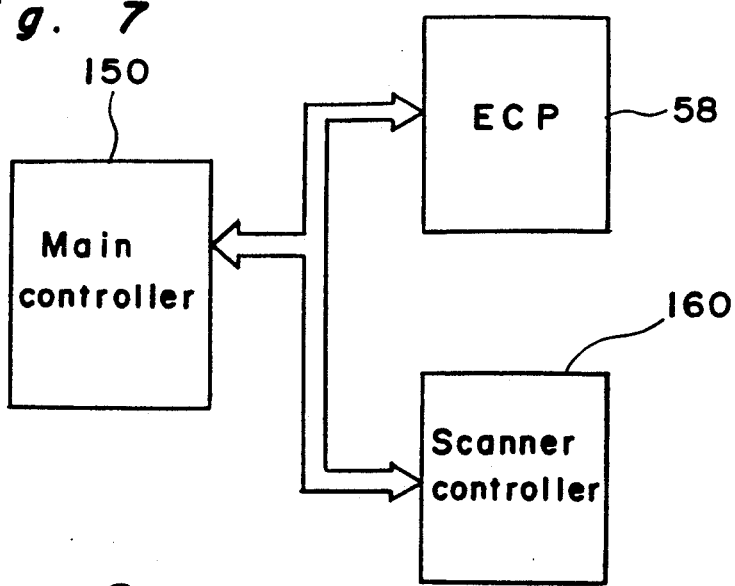
Fig. 8
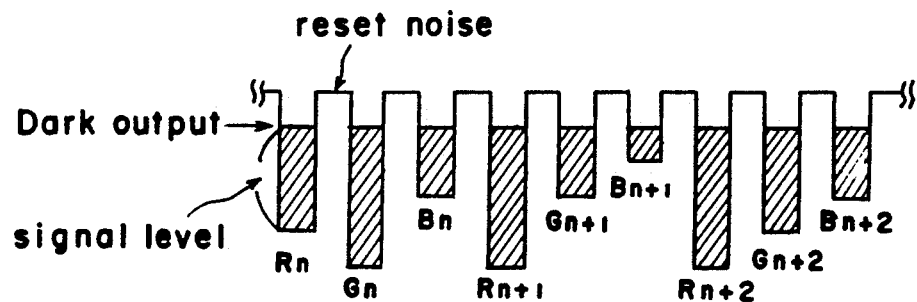
Fig. 9
| MSB B3 | B2 | LSB B1 | Color |
|---|---|---|---|
| 0 | 0 | 0 | Yellow |
| 0 | 0 | 1 | Magenta |
| 0 | 1 | 0 | Cyan |
| 0 | 1 | 1 | Green |
| 1 | 0 | 0 | Red |
| 1 | 0 | 1 | Black |
| 1 | 1 | 0 | White |

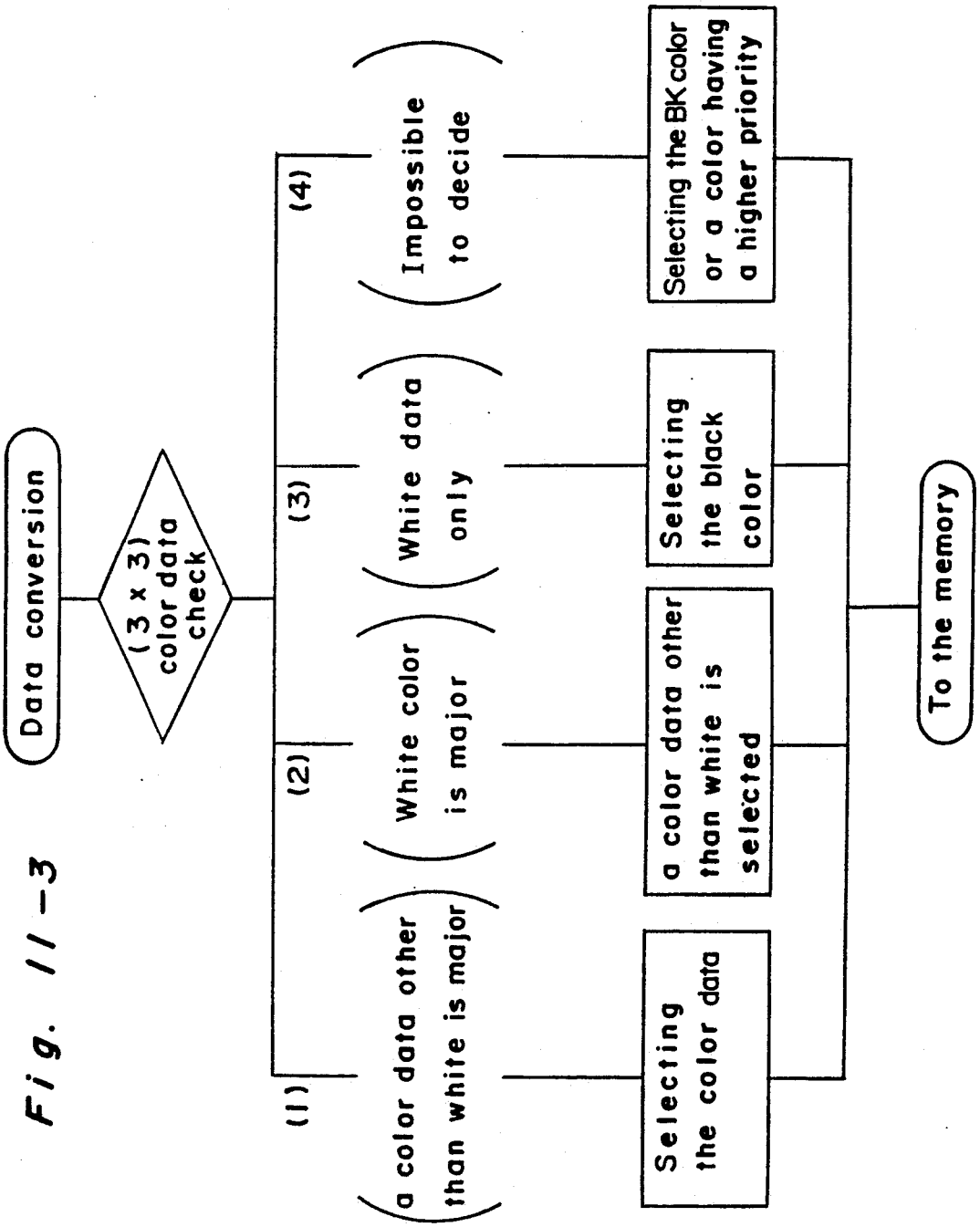

| B3 | B2 | B1 | B0 |    | 0 | 0 | 1 | 1 |

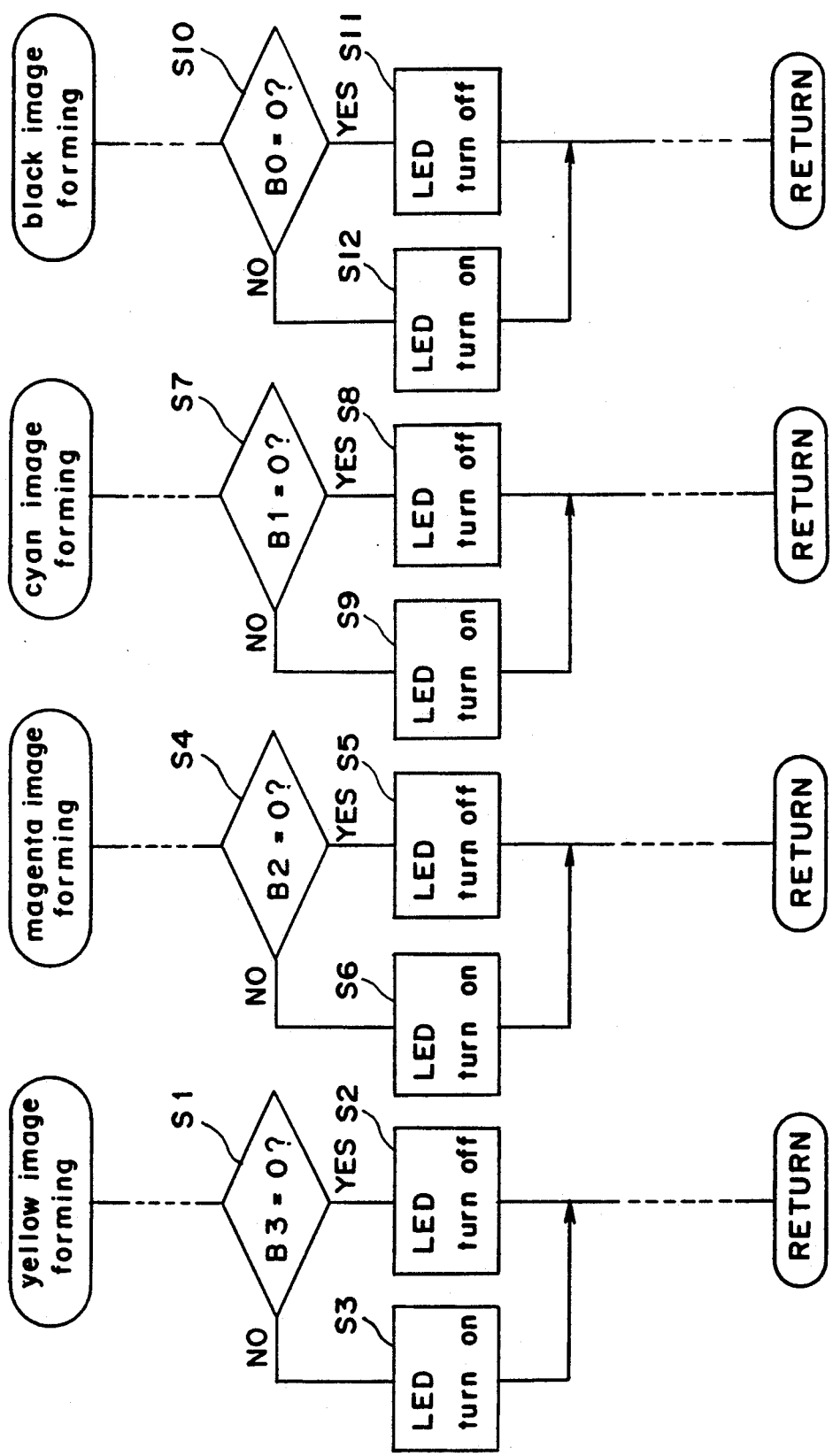

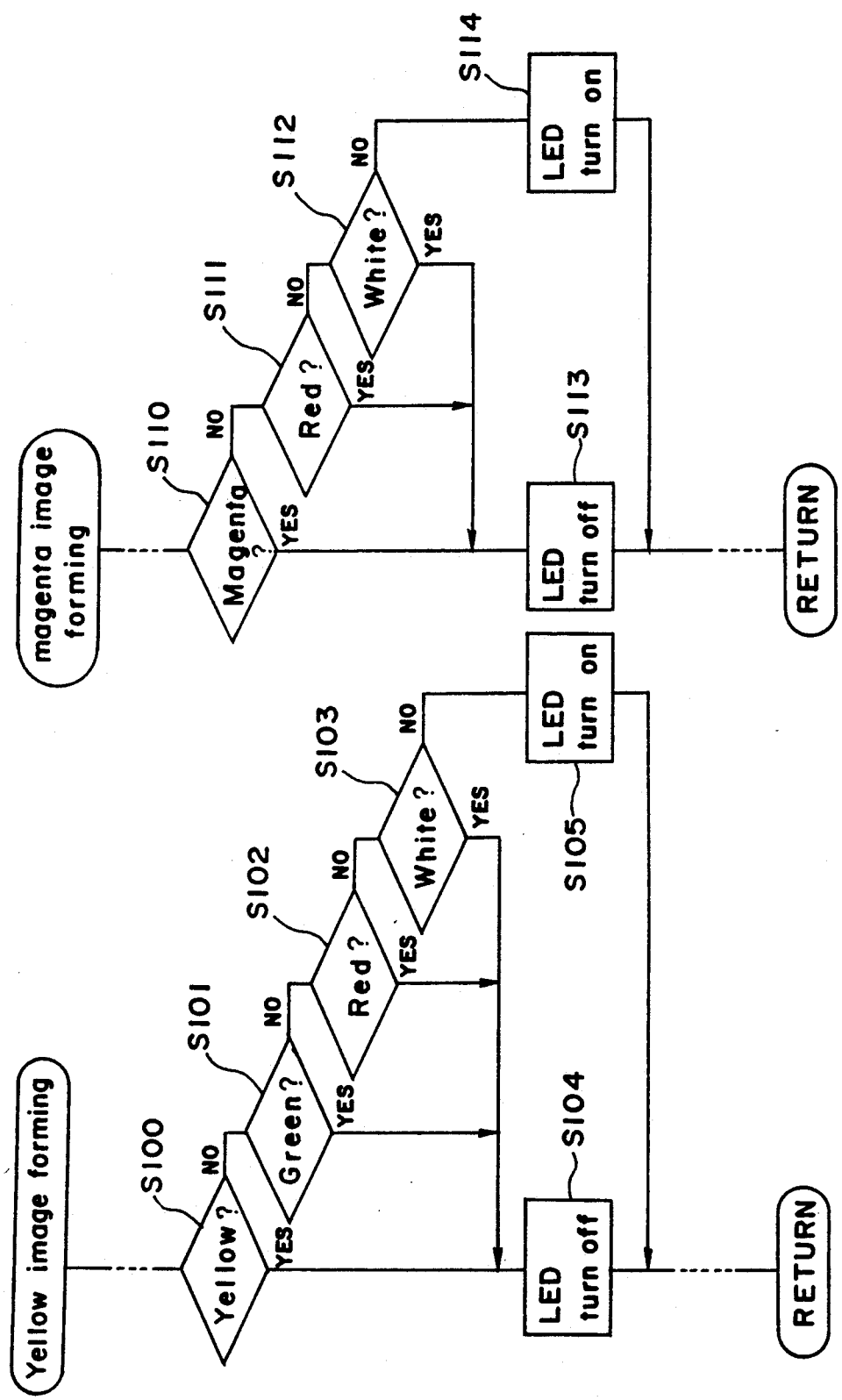

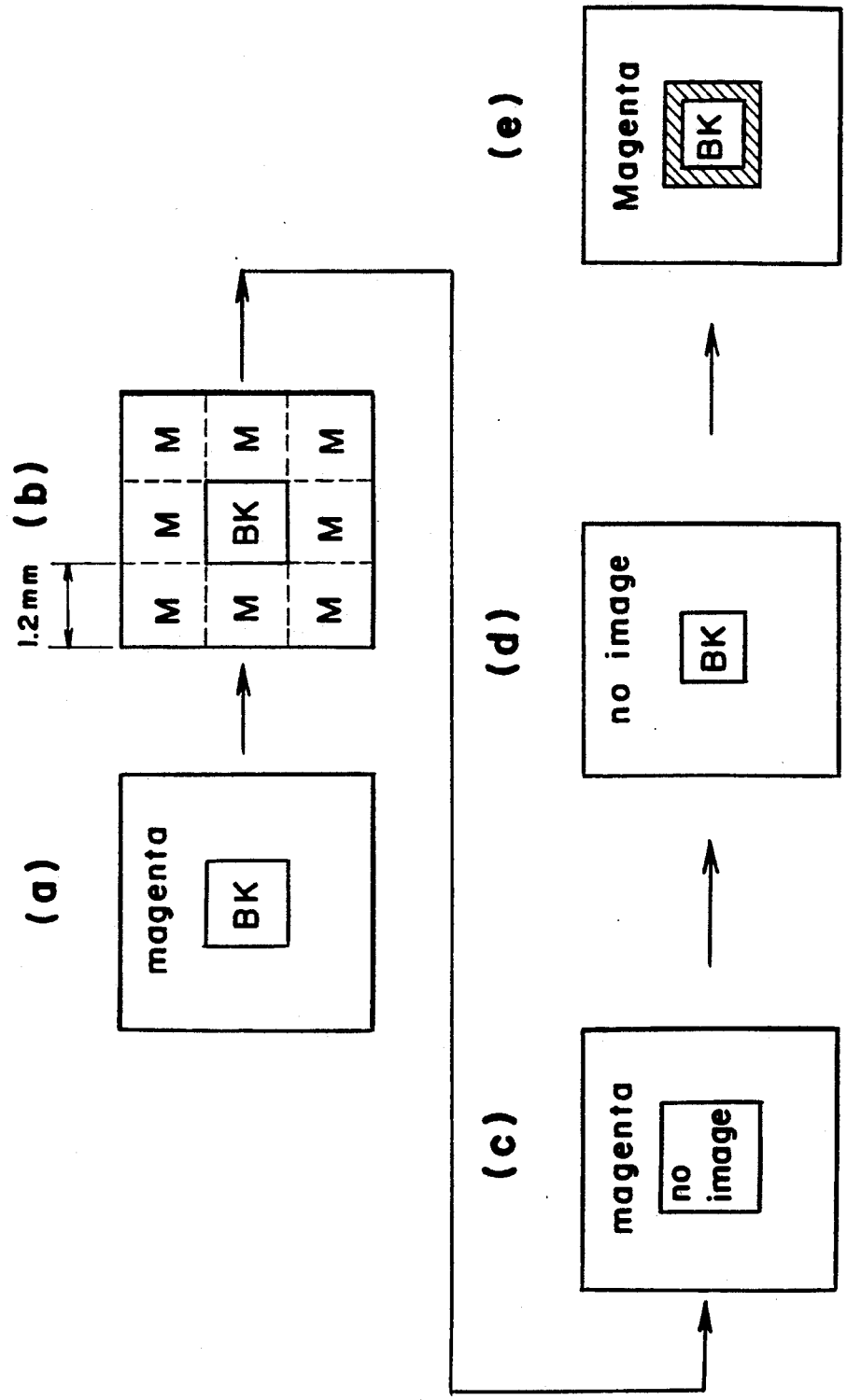

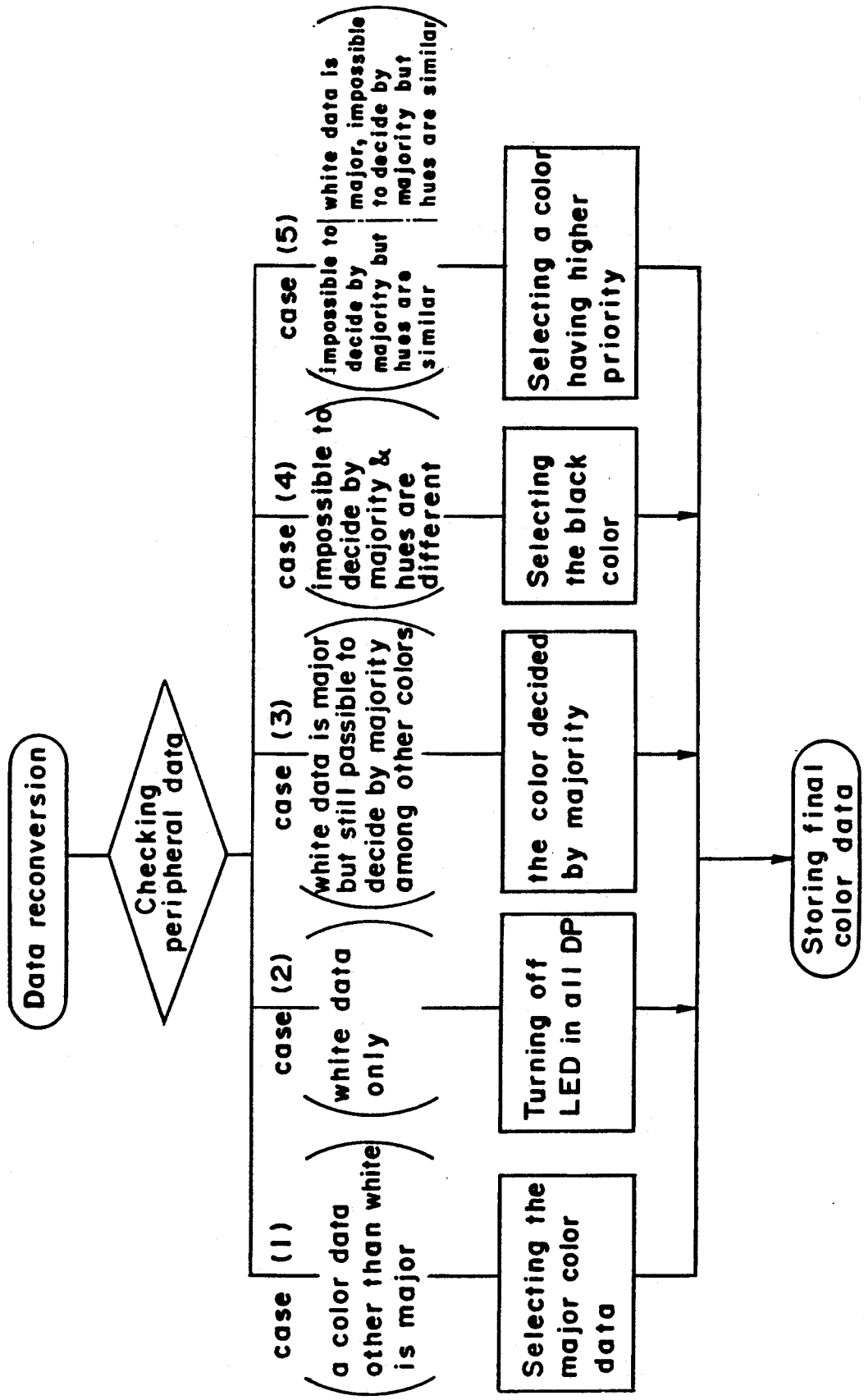

MULTICOLOR IMAGE FORMING APPARATUS WHICH CONVERTS COLOR DATA INTO ERASING DATA

BACKGROUND OF THE INVENTION

1. Field of the Invention

The present invention relates to multicolor image forming apparatuses for reproducing multicolor images of documents using electrophotographic process.

2. Description of the Related Art

Conventionally, there have been known multicolor image forming apparatuses which reproduce multicolor images by repeating the following image forming process including a step for reading a document image by a document reading means such as a CCD array decomposing it into individual colors to obtain color data, a step for forming a latent image regarding a certain color on a photoconductive body by driving a laser means according to the color data obtained, a step for developing the latent image using toner of the color and a step for transferring a toner image formed onto an intermediate transferring medium.

Also, there have been known multicolor image forming apparatuses which reproduce multicolor images by repeating an image forming process including steps for forming a latent image on a photoconductive body by scanning a document optically, for erasing unnecessary portions of the latent image using by an erasing means such as an LED array, for developing the latent image using a developing unit containing toner of a predetermined color and for transferring a toner image developed (See Japanese patent laid-open publication No. 60-194469).

The latter method has such a great merit that the mechanism forming the multicolor image can be simplified in comparison with the former method using the laser means. However, the pitch of the arrangement of LEDs (the unit of erasing) is not necessarily equal to the pitch of the arrangement of CCDs (the unit of reading). If the unit of erasing is minimized to the order of the unit of reading, the cost of the LED array becomes too high to use it in the multicolor image forming apparatus of this type.

In a conventional multicolor image forming apparatus of the latter type, the pitch of the LED array is designed to have a pitch of multiple times (usuall 3 or 4 times) of the pitch of the CCD array and, accordingly, an area of the unit of erasing defined on the photoconductive body becomes 9 or 16 times of an area of the unit of reading. In other words, 9 or 16 color data obtained by the CCD are included in a single unit of erasing. These 9 or 16 color data are not necessarily same to each other. In such a case that all color data are not same to each other, some of them are lost in the image forming process since the erasing process is performed in the unit of erasing.

In Japanese patent laid open publication No. 60-235170, there is proposed a method for preventing an image to be reproduced from deformation in configurations thereof by controlling individual light amounts of LEDs according to color data in the unit of erasing. This method utilizes the fact that the surface voltage of a latent image formed on the photoconductive body varies according to the brightness of color. Namely, if color data to be erased and not to be erased are contained in a single unit of erasing, the light amount of the LED is adjusted so as to be able to erase the color data to be erased but to maintain the color data not to be erased.

In this method, if red color portion and black color portion coexist in the unit of erasing, it is possible to erase the red color portion since the difference between the brightnesses of red and black colors is large. However, a black toner image is superimposed on a red toner image or magenta or yellow toner image) upon visualizing the black portion of a latent image by black toner and, thereby, the hue of color is changed inevitably. Further, if two colors having the brightnesses not so different from each other coexist in the unit of erasing, it becomes difficult to erase either one of them since the difference between two surface voltages corresponding to individual color portions is too small. This invites changes in configurations of image. Also, if it is possible to erase either one of them in that case mentioned above, it is inevitable for a toner image of a color having a lower brightness to be superimposed on a toner image of another color having a higher brightness. This invites changes in the hue. Since changes in the hue are caused over the whole image to be reproduced, only a poor image having a disharmoniour color balance is reproduced.

SUMMARY OF THE INVENTION

One object of the present invention is to provide a multicolor image forming apparatus which is able to prevent color image information from omission even if the unit of erasing is coarse when compared with the unit of reading.

Another object of the present invention is to provide a multicolor image forming apparatus which is able to reproduce a document image keeping configurations thereof even if they are small when compared with the unit of erasing.

One more object of the present invention is to provide a multicolor image forming apparatus which is able to control plural developing units efficiently according to color data.

A further object of the present invention is to provide a multicolor image forming apparatus which is able to omit one or more developing processes according to color information of a document.

A still further object of the present invention is to provide a multicolor image forming apparatus which is able to correct errouneous color information caused upon reading a document image.

One of other objects of the present invention is to provide a color data conversion method for converting color data obtained by reading a document image to color data for erasing without losing image information of a document even if the unit of erasing is coarse when compared with the unit of reading.

In order to achieve these objects, according to the present invention, there is provided a multicolor image forming apparatus in which the following image forming process is repeated at least one time to form a multicolor toner image on an intermediate transfer medium, the multicolor toner image is transferred onto a copy paper and is fixed; said following image forming process including the following steps;

(a) step for forming a latent image corresponding to a document image by exposing a surface of a photoconductive body electrified uniformly by a light reflected from a document illuminated by a light source, (b) step for reading the document image by a document reading means decomposing it into individual colors to obtain color data thereof, (c) step for erasing portions of the latent image except for portions thereof to be developed by an erasing means, said erasing means irradiating selectively the surface of the photoconductive drum on which the latent image is formed according to the color data obtained at the step (b), (d) step for developing the latent image not having been erased at the step (c) using toner having a predetermined color and (e) step for transferring a toner image formed on the surface of the photoconductive body onto an intermediated image transfer medium, wherein said image reading means is comprised of an array of image reading devices aligned along a main scan direction and said erasing means is comprised of an array of light emitting devices aligned along the main scan direction in which each light emitting device has a unit of erasing having a size different from that of a unit of reading by each image reading device, said apparatus being characterized by comprising a conversion means for converting the color data obtained by said image reading apparatus to color data corresponding to said unit of erasing and a control means for driving said erasing means according to the color data converted by said conversion means.

According to another aspect of the present invention, there is provided a method for forming a latent image to be developed using toner of a certain color in a multicolor image forming apparatus the following image forming process is repeated at least one time to form a multicolor toner image on an intermediate transfer medium, the multicolor toner image is transferred onto a copy paper and is fixed;

said following image forming process including the following steps;

(a) step for forming a latent image corresponding to a document image by exposing a surface of a photoconductive body electrified uniformly by a light reflected from a document illuminated by a light source, (b) step for reading the document image by a document reading means decomposing it into individual colors to obtain color data thereof, (c) step for erasing portions of the latent image except for portions thereof to be developed by an erasing means, said erasing means irradiating selectively the surface of the photoconductive drum on which the latent image is formed according to the color data obtained at the step (b);

(d) step for developing the latent image not having been erased at the step (c) using toner having a predetermined color and (e) step for transferring a toner image formed on the surface of the photoconductive body onto an intermediate image transfer medium, wherein said image reading means is comprised of an array of image reading devices aligned along a main scan direction and said erasing means is comprised of an array of light emitting devices aligned along the main scan direction in which each light emitting device has a unit of erasing having a size different from that of a unit of reading by each image reading device, being characterized in that the unit of erasing has an erea substantially equal to that of a matrix-like block comprised of the color data of a predetermined number in the unit of reading, that said color data of the predetermined number are converted to one color data in the unit of erasing according to a predetermined conversion method and that said erasing means is driven according to individual color data in the unit of erasing which have been converted from the color data in the unit of reading.

BRIEF DESCRIPTION OF THE DRAWINGS

These and other objects and features of the present invention will become clear from the following description taken in conjunction with the preferred embodiments thereof with reference to the accompanying drawings, in which:

FIG. 5 is an explanatory view for showing first to fourth developing processes according to the present invention;

FIG. 6(c) is a block diagram of a data processor according to the present invention;

FIG. 7 is a block diagram of a controller of the color copy machine according to the present invention;

FIG. 8 is an example showing output signals from a CCD array provided for reading a document image;

FIG. 9 is a table for showing an example of a composition of color data;

FIGS. 11-1 and 11-2 are flow charts showing color data conversion methods according to the present invention, respectively;

FIG. 11-3 is a flow chart of a further color data conversion method according to the present invention;

FIG. 12-3 is a graph showing output signals of a CCD corresponding to seven colors;

FIGS. 15(a), 15(b), 15(c) and 15(d) are flow charts for showing yellow, magenta, cyan and black image forming processes using the composition of color data shown in FIG. 14(a);

FIGS. 16(a), 16(b), 16(c) and 16(d) are flow charts for showing yellow, magenta, cyan and black image forming processes using the composition of color data shown in FIG. 9;

FIG. 18 shows an example of an image defect caused by an erasing means comprised of a LED array;

FIG. 21 is a flow chart of the data reconversion method according to the present invention;

DETAILED DESCRIPTION OF THE PREFERRED EMBODIMENT

Figure 1:
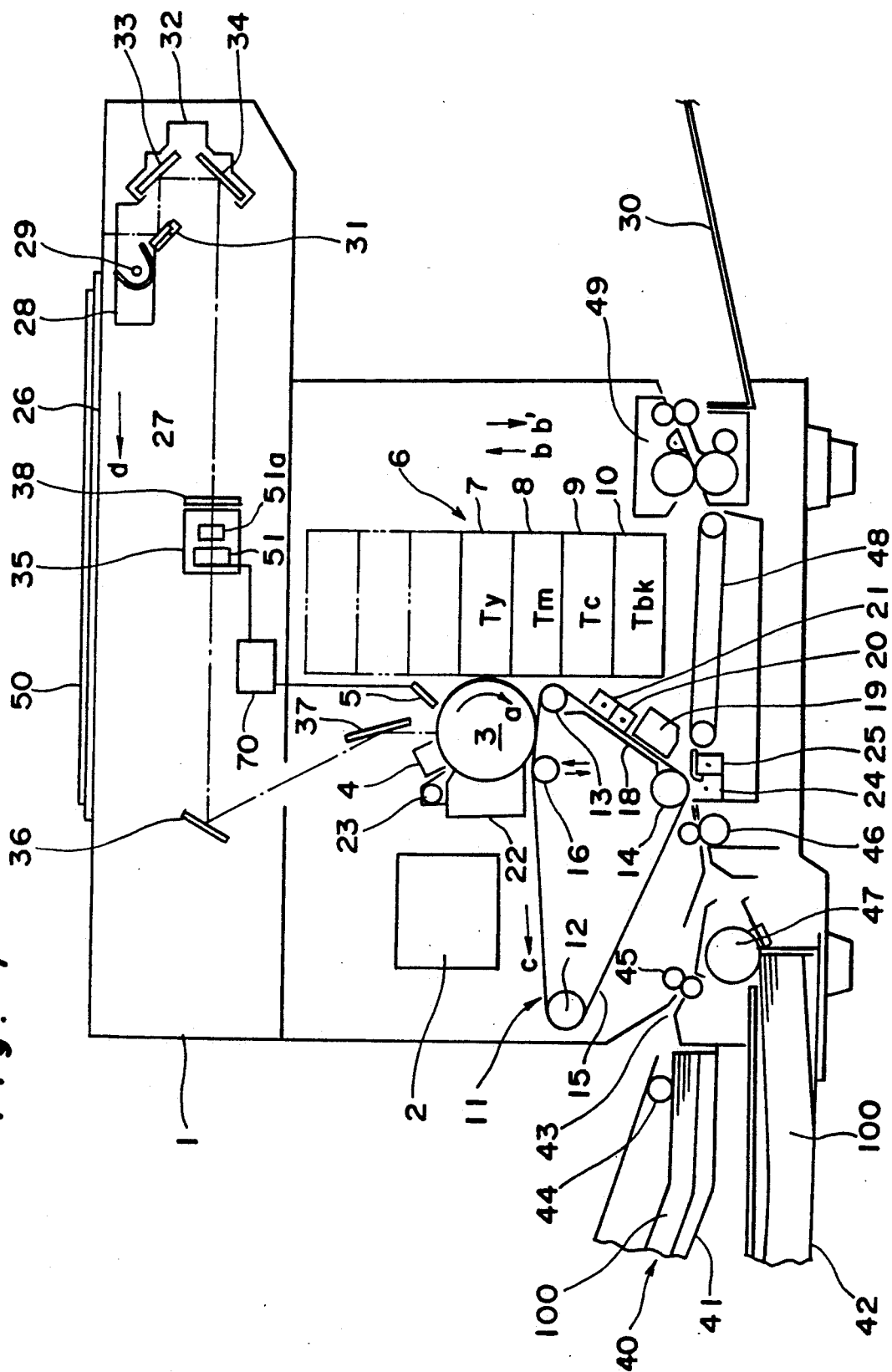
FIG. 1 is a schematical sectional view of a color copy machine to which the present invention is applied.

FIG. 1 is a schematic sectional view of a copying machine to which the present invention is applied.

Composition of Copying machine

In a main body of the copying machine, a photoconductive drum 3 is arranged at the center portion thereof rotatably in a clockwise direction as indicated by an arrow a around the axis thereof, an electrifying charger 4, an editing eraser 5, a developing device 6, a transferring device 11, a cleaning device 22 and a main eraser 23 are arranged in the clockwise direction a.

Figure 2:
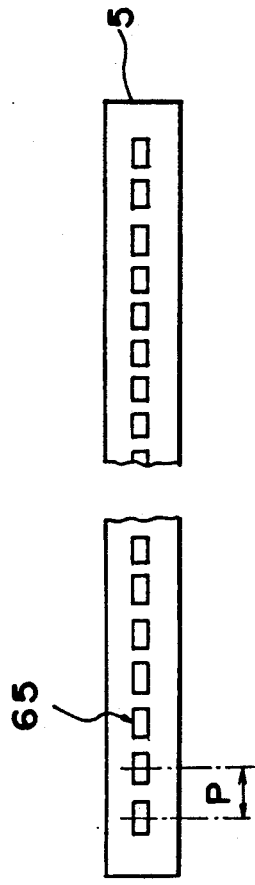
FIG. 2 is a partial plan view of an LED array for erasing unnecessary portions of a latent image formed on a photoconductive body.

The editing eraser 5 is comprised of an LED array in which a number of LEDs 65 are arranged linearly in the axial direction of the photoconductive drum 3 as shown schematically in FIG. 2. In the preferred embodiment of the present invention, the pitch of the LED 65 is set at 1.2 mms.

The developing device 6 is comprised of four developing units 7, 8, 9 and 10 and is movable up and down as indicated by arrows b and b' so as to be able to supply desirable toner by one of four developing units 7 to 10. Yellow toner Ty, magenta toner Tm, cyan toner Tc and black toner Tbk are contained in the four developing units 7 to 10, respectively. The developing device 6 is not limited to the type mentioned above and is usable if it can supply desired color toner to the photoconductive drum 3 selectively.

The transferring device 11 comprises an endless transferring belt 15 for transferring individual toner images formed on the photoconductive drum 3. The transferring belt 15 is formed by an electrically conductive base material such as electrically conductive polyester containing carbon resin on which an inductive material such as polyethylene is coated. Three rollers 12, 13 and 14 are arranged at respective apexes of a triangle so as to span the transferring belt 15. A press roller 16 is arranged inside of the belt 15 and between two rollers 12 and 13. The press roller 16 is supported so as to be able to move up and down as indicated by two arrows and, at the up position thereof, the belt 15 is pressed to transfer a toner image formed on the drum 3 thereto. Further, a guide plate 18 is arranged in parallel with and inside of the portion of the belt 15 running between two rollers 13 and 14 and, outside thereof, a cleaning device 19, a discharging charger 20 and an electrifying charger 21 are arranged. Below the roller 14, a secondary transferring charger 24 for transferring a toner image formed on the belt 15 onto a copy paper is arranged and, at the side thereof, a separating charger 25 for separating the copy paper from the belt 15 is arranged.

In the above space of the main body of the copying machine, an optical scanning system 27 is arranged. The optical scanning system 27 is comprised of first and second sliders 28 and 32. The first slider 28 provides with an illumination lamp 29 and a first mirror 31 and is driven along a document platen 26 so as to scan a document set on the document platen 26 in a direction as indicated by an arrow d. The second slider 32 provides with second and third mirrors 33 and 34 and is driven at a half of a running speed of the first slider 28 in the scan direction d. On the left of the second slider 32, a focusing lens assembly 35 and a third mirror 36 are arranged and, above the drum 3, a fifth mirror 37 is arranged for projecting a document image obtained by a scan of the document onto the drum 3. In front of the focusing lens assembly 35, a filter 38 is arranged. Further, at one side of the focusing lens assembly 35, a color CCD array 51 and a focusing lens 51a for focusing the document image on the color CCD array 51 are arranged. The filter 38 provides a filter element for cutting off infrared ray components of the document image and a filter element for passing cyan components thereof. These two filter elements are selectively switchable to the lens assembly 35.

In the bottom space of the main body 1 of the copying machine, there are provided paper supplying and transporting systems. The paper supplying system 40 are comprised of first and second paper supplying units 41 and 42 and a manual paper inserting unit 43.

A copy paper 100 in the first paper supplying unit 41 or inserted manually into the manual paper inserting unit 43 is fed by a pair of feeding rollers 45 and a copy paper 100 in the second paper supplying unit 42 is fed by a pair of feeding rollers 47. The copy paper fed by the pair of feeding rollers 45 or 47 is fed by a pair of timing rollers 46 so as to pass between the belt 15 and the secondary transfer charger 24. Then, the copy paper is forwarded to a fixing device 49 by a conveyer belt 48 and discharged on a copy tray 30 after fixing the toner image on the copy paper.

Copying action

Next, fundamental copying actions to be done by the copying machine will be explained referring to FIG. 1.

When a print switch (See 300 of FIG. 3) is operated, the photoconductive drum 3 is driven to rotate in the clockwise direction a, via a driving mechanisms including a main motor 2 and the surface thereof is electrified at a predetermined voltage by discharge from the electrifying charger 4.

In the optical scanning system, the first and second sliders 28 and 32 are started to scan a document set on the document platen 26 in the direction d. A light beam projected on the document by the illumination lamp 29 and reflected by the document is projected on the photoconductive drum 3 via the mirrors 31, 33 and 34, the filter 38, the focusing lens assembly 35 and the mirrors 36 and 37 to form a latent image thereon.

The editing eraser 5 illuminates selectively unnecessary portions on the surface of the drum 3 to remove charge therefrom and also, charge of an image of a predetermined color is erased based on the result of detection by the color CCD 51, as will be stated later in detail.

Thereafter, the latent image formed on the drum is developed as a toner image with toner supplied from one of the developing units 7 to 10 of the developing device.

On the other hand, in the transferring apparatus 11, the press roller 16 is moved upward to make the transferring belt 15 contact with the surface of the drum 3 between the roller 13 and the press roller 16. The belt 15 is driven to run in the direction c and is charged uniformly by the electrifying charger 21. The running speed of the transferring belt 15 is set at the same speed as a peripheral rotation speed of the photoconductive drum 3 in order to prevent relative lag therebetween. When the toner image formed on the drum 3 comes to the contacting zone with the belt 15, it is transferred electrostatically to the belt 15 by the action of the charge given from the electrifying charger 21.

After the transfer of the toner image, toner remaining on the surface of the drum 3 is removed by the cleaning device 22 and charge remaining thereon is erased by the main eraser 23 for the next image formation process. The toner image transferred onto the belt 15 is conveyed thereby in the direction c.

This copying action is repeated with respect to individual colors of yellow, magenta, cyan and black and individual color toner images are superimposed on the transferring belt to form a multicolor image.

On the other hand, a copy paper 100 supplied from the paper supplying apparatus is fed to the secondary transferring station defined between the roller 14 and the secondary transfer charger 24 by the timing rollers 45, 46 in synchronization with the multicolor image formed on the belt 15. The multicolor image is transferred secondarily onto the copy paper 100 by the action of the secondary transfer charger 24. Then, the copy paper on which the multicolor image has been transferred is separated from the belt 15 and is conveyed to the fixing device 49 by the conveyer belt 48. The fixing device 49 discharges the copy paper 100 onto the discharging tray 30 after fixing the multicolor image.

Residual toner and charge on the belt 15 are removed and erased by the cleaning device 19 and the erasing charger 20 in order for the next image formation process.

Operation panel

Figure 3:
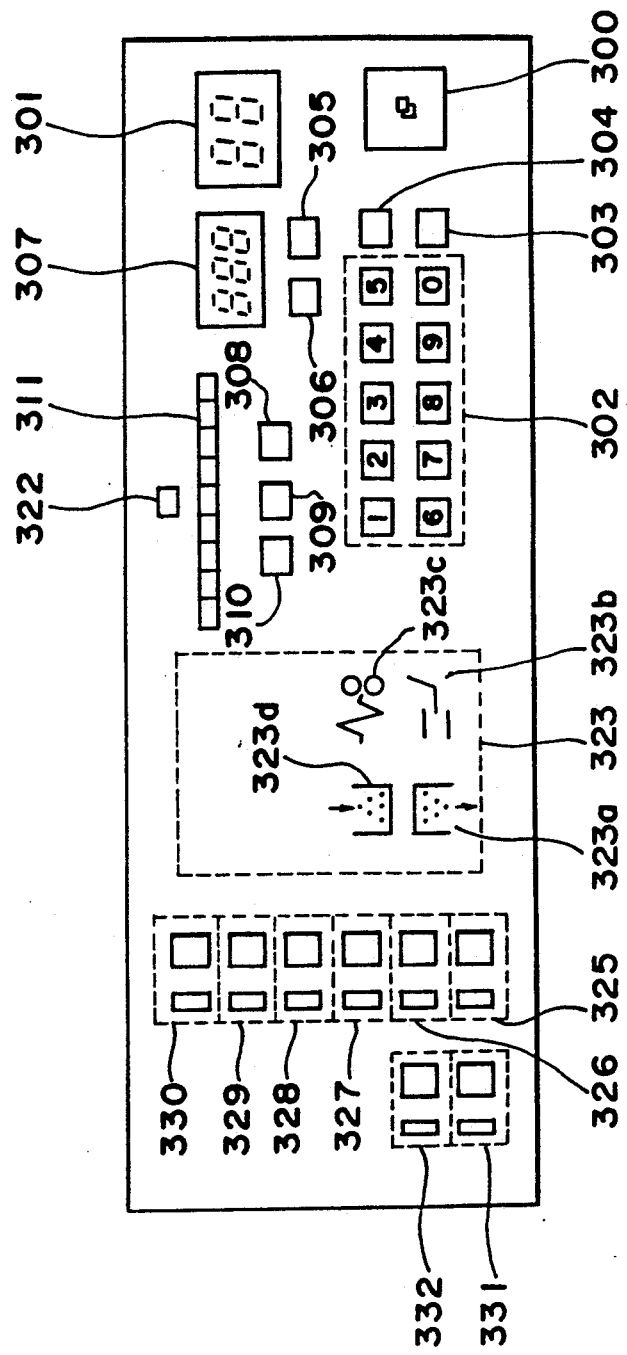
FIG. 3 is a plan view of an operation panel of a color copy machine according to the present invention.

FIG. 3 shows a plan view of an operation panel for inputting various indications which is provided on the upper front surface of the copying machine.

A key 300 is a print switch for starting a copying action and a group 302 of the keys is comprised of so called ten keys for entering a number of copies and the like. A display 301 is a displaying LED for displaying the number of copies entered using ten keys 302. Keys 305 and 306 are keys for setting a desired copy magnification and an LED 307 is for displaying the copy magnification designated using keys 305 and 306. Keys 308 and 310 are for setting a desired exposure amount manually and the key 308 is an up-key for increasing the exposure amount and the key 310 is a down-key for decreasing it. The level of the exposure amount is displayed by a group 311 of LEDs. A key 309 is provided for designating a mode for automatically controlling the exposure amount and an LED 322 is an indicator for indicating that the automatic exposure control mode has been selected. A key 303 is a CLEAR/STOP key and a key 304 is an interruption key. A display area 323 is provided for displaying the present state of the copying machine. In the display area 323, indicators 323a, 323b, 323c and 323d are provided for displaying overflow state of discarded toner, interruption mode, jamming of copy paper and toner empty state, respectively. Reference numerals 325 to 330 are switches corresponding to respective developing units and indicators for indicating each of developing units when selected. Further, reference numerals 331 and 332 indicate a switch for switching from a copy mode including one developing process to a copy mode including plural developing processes and an indicator therefor.

Color copy action

Figure 4A:
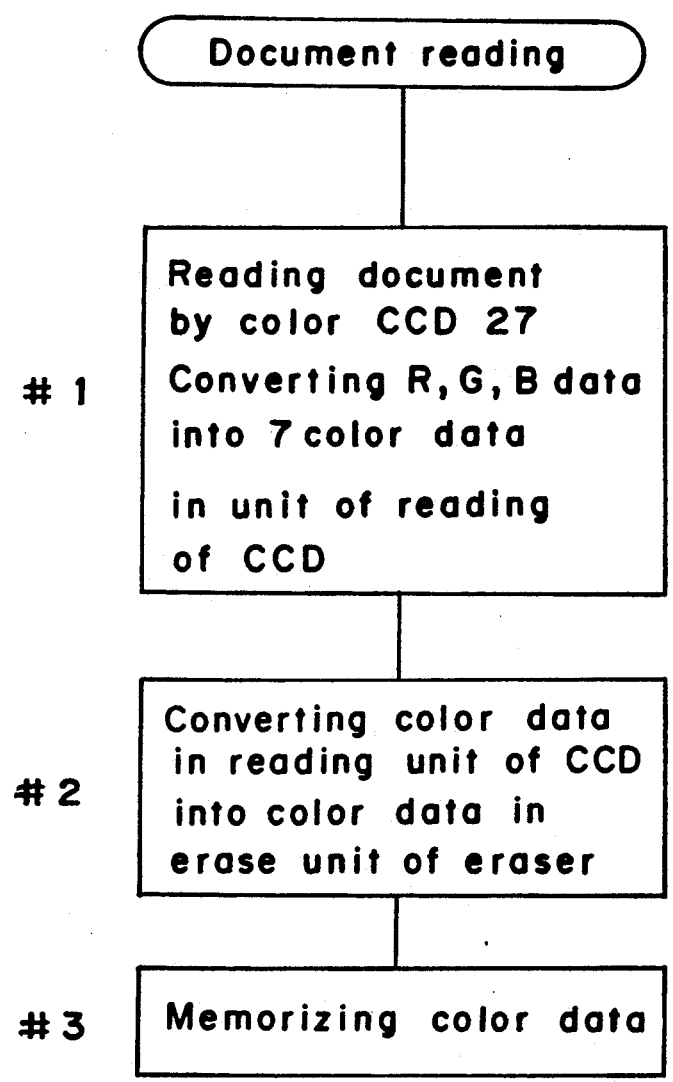
FIGS. 4(a) and 4(b) are flow charts of document reading process and image forming process, respectively.
Figure 4B:
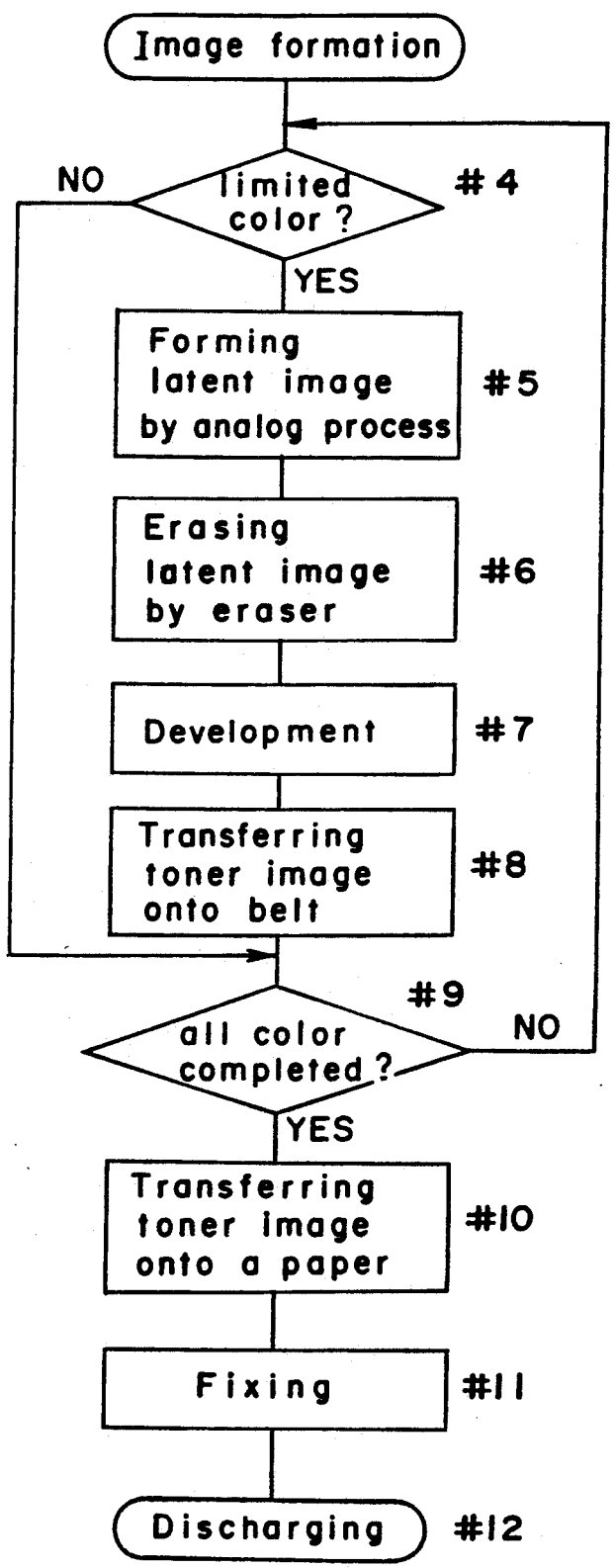

FIGS. 4(a) and 4(b) show flow charts for reading a document and for forming an image.

In a document reading process, data of R, G and B outputted from the color CCD 51 are converted into color data in a unit of reading of the color CCD 51 at step #1. Then, the color data are further converted into color data in a unit of erase of the editing eraser 5 at step #2. The color data are memorized in a memory at step #3. This process is done repeatedly to cover the maximum size of the document, for example A3 size.

Figure 6A:
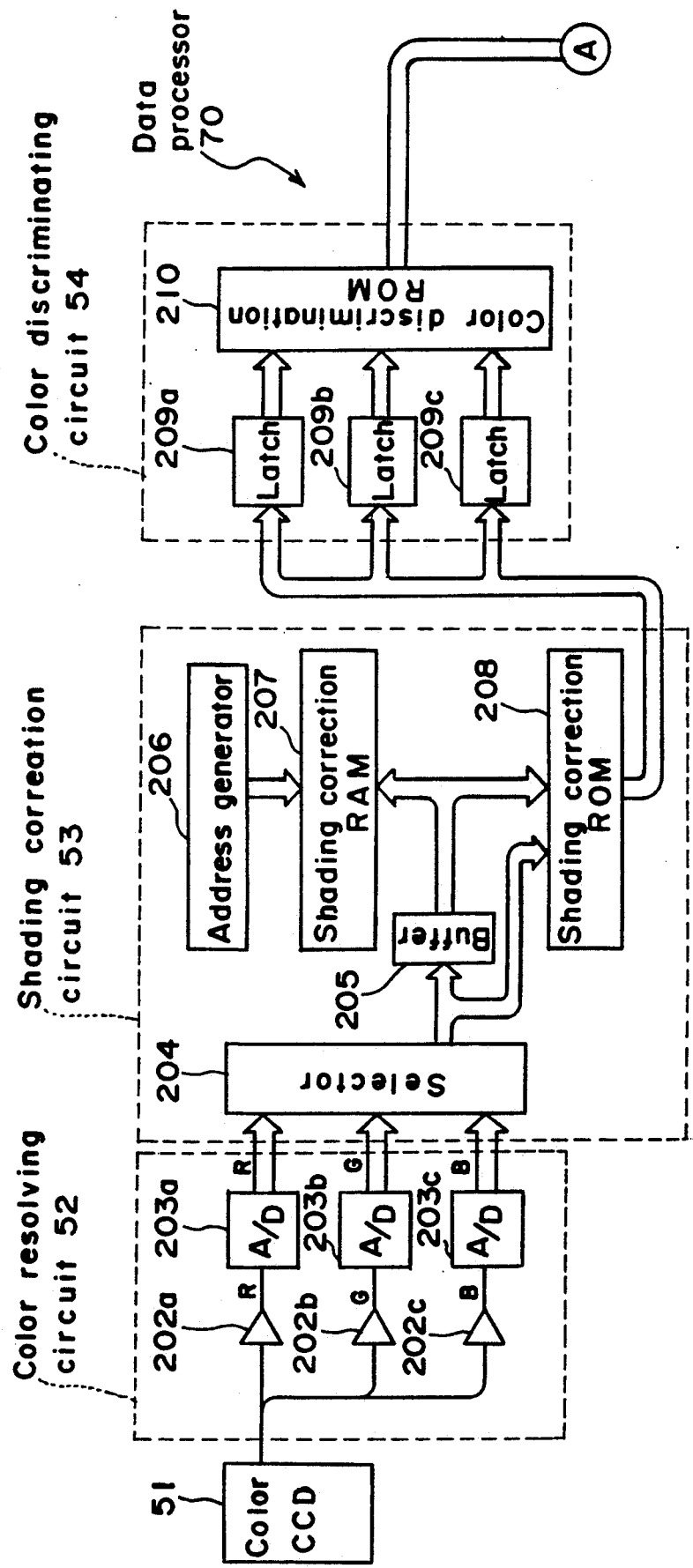
FIGS. 6(a) and 6(b) are block diagrams of a data processor according to the present invention.
Figure 6B:
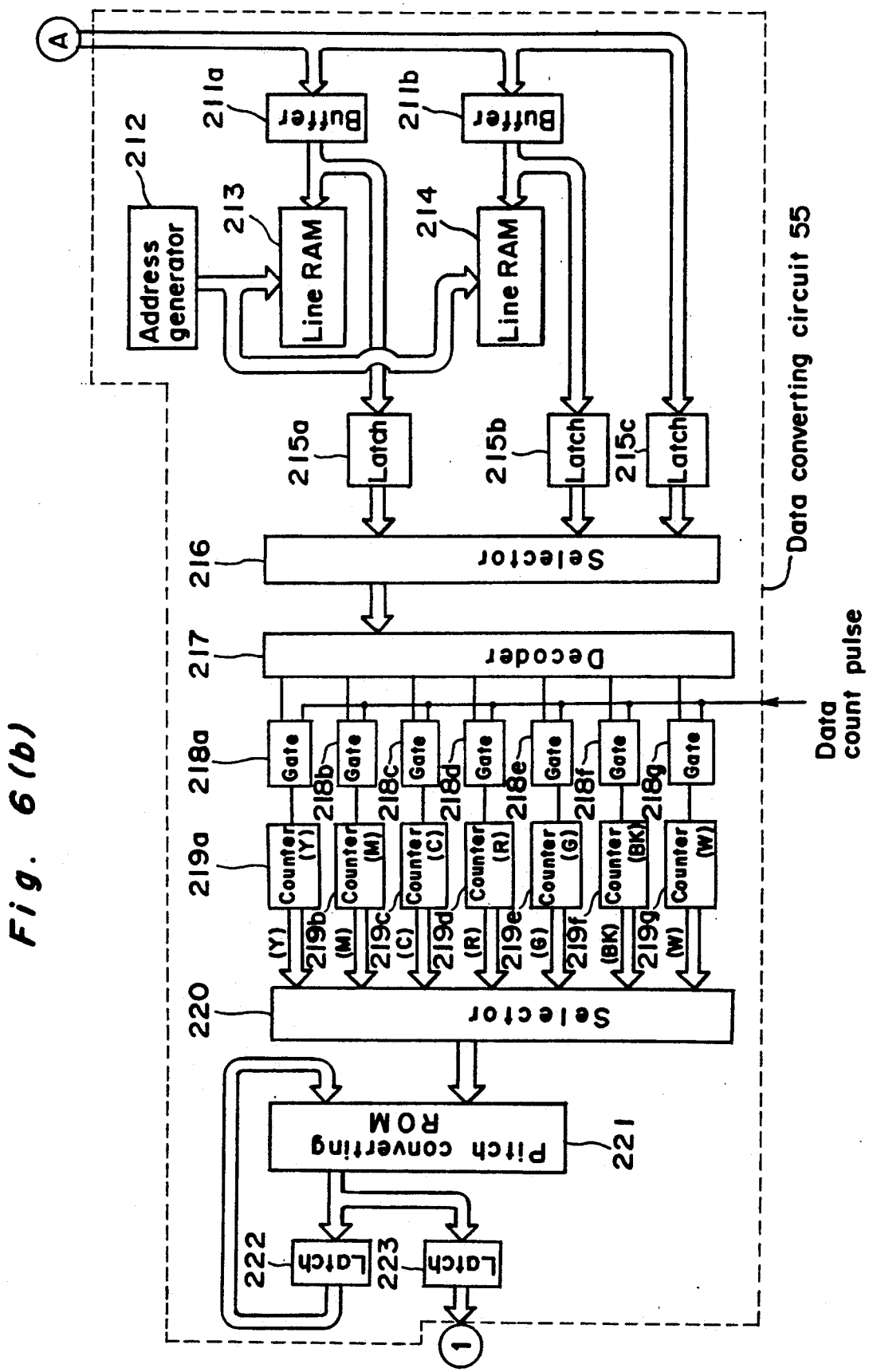

In an image forming process, it is decided, at step #4, according to a result of detection by a limited color detecting circuit (See FIGS. 6(b) and 15) whether or not the color of toner to be used this time is necessary for reproducing the document image. If decided necessary, the process proceeds to step #5. If no, the process skipps to step #9 since the developing action is unnecessary.

At step #5, the document is scanned to form an electrostatic latent image on the photoconductive drum 3 (the latent image formation by the analogue process) and unnecessary portion of the latent image is erased by the editing eraser 5 based on the data obtained by the document reading process and corresponding to the toner color to be used this time at step #6. Then, the latent image is visualized by the developing unit selected presently at step #7 and the toner image thus formed is transferred onto the transferring belt 15 at step #8. The process from step #4 to step #8 is repeated with respect to four toners. When the developing process has been completed with respect to all toners (YES at step #9), the toner image is transferred from the belt 15 to a copy paper at step #10 and is fixed by the fixing unit 49 at step #11. Finally, the copy paper is discharged onto the tray 30 at step #12.

FIG. 5 is an explanatory chart for showing a color copy process.

At (a) in FIG. 5, an example of document is shown.

The document has a black rectangle, a yellow square, a red circle and a green triangle on a white ground. These color portions are separated with each other.

This document is scanned to read the document image. The light beam reflected from the document is projected on the color CCD 51 through the lens 51a for the color CCD 51. Output data therefrom are processed according to an image processing method which will be explained later in detail and, thereby, colors of respective portions of the document are identified. The color CCD 51 is a conventional type wherein R, G and B filters are arranged at each light receiving element comprising three CCD tips. The reading unit is defined as a set of R, G and B output data obtained from three CCD tips of each light receiving element. The color discriminations is made using R, G and B output data.

The document is scanned first time to expose the photoconductive drum 3 which is charged uniformly by the electrifying charger 4. By this exposure, an electrostatic latent image corresponding to the document is formed on the photoconductive drum 3. This state is shown at (b1) of FIG. 5. Since the developing units 7 to 10 are selected in the order of yellow (y), magenta (m), cyan (c) and black (bk) in the present preferred embodiment, the yellow developing unit 7 is selected in the first developing process. Accordingly, the latent image corresponding to the black rectangle is erased by the editing eraser 5. This state is shown at (c1) of FIG. 5. Since red color is made by mixing yellow and magenta and green color is made by mixing yellow and cyan, the latent images corresponding to the red circle and the green triangle are not erased.

Then, latent images are visualized by the yellow toner supplied from the first developing unit 7 as indicated at (1) of FIG. 5. The yellow toner image on the drum 3 is transferred to the transferring belt 15.

Next, the second developing process is performed similarly to the first developing process. Namely, a latent image corresponding to the document is formed on the drum 3 ((b2) of FIG. 5), latent images corresponding to the black rectangle, yellow square and green triangle are erased by the editing eraser 5 since they are unnecessary to develope with the magenta toner ((c2) of FIG. 5). The remaining latent image corresponding to the red circle is developed with the magenta toner supplied from the second developing unit 8 ((d2) of FIG. 5) and the magenta toner image is transferred onto the belt 15 on which the yellow toner image has been transferred ((e2) of FIG. 5). Since the magenta toner image corresponding to the red circle is superimposed on the yellow toner image corresponding to the same in the second process, the red circle is formed as indicated at (e2) of FIG. 5. The third developing process is performed with respect to the cyan toner as shown from (b3) to (e3) of FIG. 5. In this process, only the latent image corresponding to the green triangle is left to develope it with the cyan toner supplied from the third developing unit. The cyan toner image is superimposed on the yellow toner image to form the green triangle.

Further, the fourth developing process is performed with respect to the black toner as indicated from (b4) to (e4) of FIG. 5. In this process, the latent image corresponding to the black rectangle is developed with the black toner supplied from the fourth developing unit 10 and the black toner image is transferred onto the belt 15.

Thus, a multicolor image corresponding to the document image is formed on the belt 15 and the toner image on the belt 15 is transferred onto a paper as shown at (f) of FIG. 5.

As is well known to those skilled in the art, a mark is provided on the belt 15 which is detected by a sensor (not shown). The transfer process of each toner image is synchronized using the detection signal by the sensor so as to prevent relative shifts among the toner images.

FIGS. 6(a) and 6(b) show a block diagram of an image processor and FIG. 6(c) shows a block diagram of a controller of the editing eraser 5.

Image information detected by the color CCD 51 is outputted as serial R, G and B analogue signals and is inputted into a color resolving circuit 52. In the color resolving circuit 52, the serial analogue signals are converted to parallel signals by taking timings and R, G and B analogue signals are amplified by amplifiers 202a to 202c and converted to digital signals by A/D (analogue to digital) converters 203a to 203c. These digital signals are sent to a shading correction circuit 53. In the shading correction circuit 53, digital signals are selected every R, G and B signals by a selector 204 and each selected signal is read out through a buffer 205 to correct differences in the output property proper to individual picture elements of the color CCD 51 and those caused by the optical scanning system 27. This shading correction is made according to contents stored in a shading correction RAM 207 and contents of a table for the shading correction stored in a shading correction ROM 208 in synchronization with address signals generated by an address generating circuit 206. In the shading correction RAM 207, one line data obtained by reading a standard white pattern (not shown) which is provided on a lower surface of a document scale arranged along an edge of the document platen are stored.

Data thus corrected are sent to a color discriminating circuit 54. Every R, G and B data are latched by the latches 209a to 209c and a color is discriminated among yellow, magenta, cyan, black, red, green and white by referring values of R, G and B components to a table stored in a color discriminating ROM 210. The color data thus discriminated constitutes the unit of reading a document mentioned above.

In a data converting circuit 55 shown in FIG. 6(b), these color data in the unit of reading of the color CCD 51 are converted to color data in the unit of erasing of the editing eraser 5. This data conversion is based on the difference between the size of each picture element of the color CCD 51 and that of each LED element of the editing eraser 5. In the present preferred embodiment, it is performed every three reading lines. When the third line data are started to enter into the data converting circuit 55 after storing the first and second line data in line memory RAMs 213 and 214, respectively, every three color data of each of the three line data, namely $3 \times 3 = 9$ color data, are selected by a selector 216 via three latches 215a to 215c in synchronization with synchronizing signals.

Each of nine color data is decoded by a decoder 217 and is sent to one of seven gates 218a to 218g corresponding to seven colors according to the color decoded. Each gate is opened by the output signal from the decoder 217 and a data count pulse inputted in synchronization with the output signal. Seven data counters 219a to 219g are provided corresponding to seven gates 218a to 218g to count individual numbers of colors with respect to nine color data. When the count of colors is completed with respect to nine color data, all data counters 219a to 219g are reset for the next count.

A selector 220 sends respective count values obtained by the four data counters 219a to 219d (yellow, magenta, cyan and red) to a pitch converting ROM 221 to obtain a converted value by referring four count values to a table stored in the pitch converting ROM 221. Then, the converted value is latched by a latch 222.

Next, three count values obtained by other three data counters 219e to 219g (green, black and white) are sent to the pitch converting ROM 221 in order to select a color by referring three count values to the value latched by the latch 222 and the table stored in the pitch converting ROM 221. Information with respect to the selected color is latched by a latch 223 as a color data in the unit of erasing by the editing eraser 5. Then, the latched color data in the unit of erasing is sent to a memory circuit 56 and a limited color detecting circuit 57 parallel, as shown in FIG. 6(c).

The memory circuit 56 stores color data in the unit of erasing sent from the data converting circuit 55 in a RAM 227 in synchronization with address signals generated by an address generating circuit 225. The color data and the address signal are inputted, via buffers 224 and 226, into the RAM 227.

The limited color detecting circuit 57 is provided for checking contents of the data and storing the data in parallel to the storing the data from the data conversion circuit 55 into the memory circuit 56. If a document has monochromatic, for instance black, image information on it, the first to third developing processes become unnecessary to reproduce the black document image. The limited color detecting circuit 57 determines one or more unnecessary color toners to reproduce a document image based on the output color data from the data conversion circuit 55. If one or more unnecessary color toners are determined thereby, one or more developing processes are omitted in order to avoid wastes of time and running cost.

Whole color data regarding a document stored in the memory circuit 56 are read out of the RAM 227, via buffers 228 and 229, by a microcomputer 232 provided in an ECP (Electric Control Processor) 58 and sent to a controller 59 for controlling the editing eraser 5.

In the present preferred embodiment, the storing color data read by the CCD into the memory 227 and the detecting limited color toners are executed quickly by hardwares employed and, therefore, the processing time can be shortened effectively.

Control of copying machine

FIG. 7 shows a block diagram of a control circuit for controlling the copying machine according to the present preferred embodiment of the present invention.

The copying machine is controlled by three microcomputers 58, 150 and 160 connected by communication lines with each other.

The main controller 150 is provided for performing so called sequence control including paper supplying, paper conveying, fixing and exposure processes, for corresponding to data entry from the operation panel and controlling individual displays and indicators thereon and for controlling communication among the microcomputers.

The ECP 58 mainly controls the data processor 70.

The scanner controller 160 is provided for controlling a scanning motor (not shown) for driving the first and second sliders 28 and 32 of the optical scanning system.

Data conversion method

Next, the method of data conversion to be executed by the data converting section 55 will be stated in detail.

Unit of reading by the CCD

At first, the unit of reading by the CCD 51 is explained.

The color CCD 51 to be used in the present preferred embodiment is assumed to have effective light receiving picture elements of 2,250. Assuming that the width of reading of a document is 300 mms, the pitch of image reading is calculated to be 0.4 mms [$=300 \div (2250 \div 3)$] since every three data of R, G and B are considered to form a color data. Namely, the color of a document is discriminated in the unit of this pitch. This pitch of image reading is related to the main scan direction. The pitch of image reading in the sub-scan direction is assumed to be 0.4 mms in the present preferred embodiment although it is changed depending on the scan speed of the optical scanning system and the charge accumulation time of the CCD. Thus, the unit of reading by the color CCD 51 is defined as an area of $0.4 \times 0.4$ mm$^2$ on the document.

FIG. 8 shows output data from the color CCD 51. As shown therein, analogue outputs obtained by incident lights passed through the R, G and B filters are generated serially. Hatched portions indicate real signals. Each set of R, G and B signals such as (Rn, Gn, Bn) forms the unit of reading of the color CCD corresponding to an area of $0.4 \times 0.4$ mm$^2$ on the document. In the color discriminating section mentioned above, real signal components are taken out from output signals and each signal component is converted by the A/D converter. Then, respective digital data are subjected to the shading correction and, further, are converted into color data indicating either one of yellow, magenta, cyan, red, green, black and white, respectively.

FIG. 9 shows examples of color data outputted from the color discriminating section.

Each color data is outputted as a digital signal of three bits. "000", "001", "010", "011", "100", "101" and "110" represent yellow, magenta, cyan, green, red, black and white, respectively.

Conversion from the unit of reading to the unit of erasing

LEDs 65 of the editing eraser 5 are arranged linearly in the main scan direction with a pitch of 1.2 mms. Accordingly, the pitch of the unit of erasing in the main scan direction becomes equal to the pitch (=1.2 mms) of the LED array.

The pitch of the unit of erasing in the sub-scan direction is assumed to be 1.2 mms in the present invention though it may change depending on the rotational speed of the drum 3 and the processing time by the data processing section 70. Thus, the unit of erasing on the photoconductive drum 3 is defined an area of $1.2 \times 1.2$ mm$^2$. Because of the difference between sizes of the unit of reading and the unit of erasing, it becomes necessary to convert the color data of the unit of reading into a color data having a size equal to the unit of erasing. The data converting section 55 is provided therefor.

Figure 10:
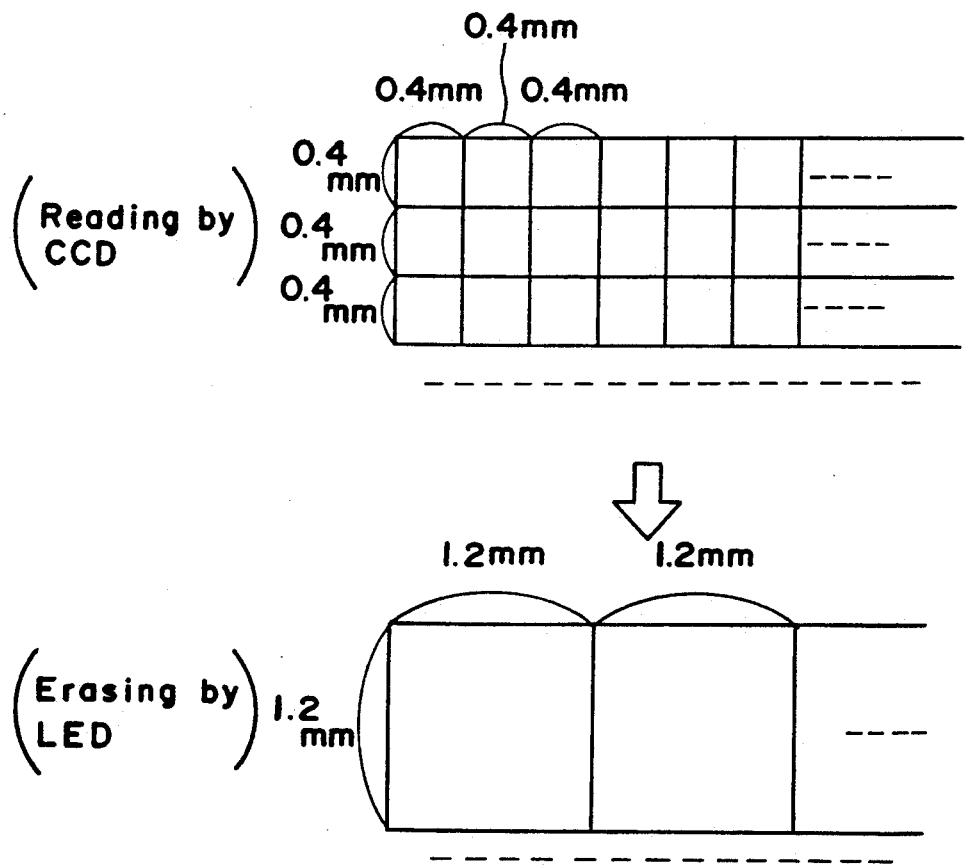
FIG. 10 is an explanatory view for showing relation between the unit of reading and the unit of erasing.

FIG. 10 shows the data conversion schematically.

Since the unit of reading by the color CCD 51 is $0.4 \times 0.4$ mm$^2$ and the unit of erasing by the editing eraser 5 is $1.2 \times 1.2$ mm$^2$, color data of $3 \times 3$ of the unit of reading are converted into one color data of the unit of erasing according to a predetermined calculation method.

Figure 11:
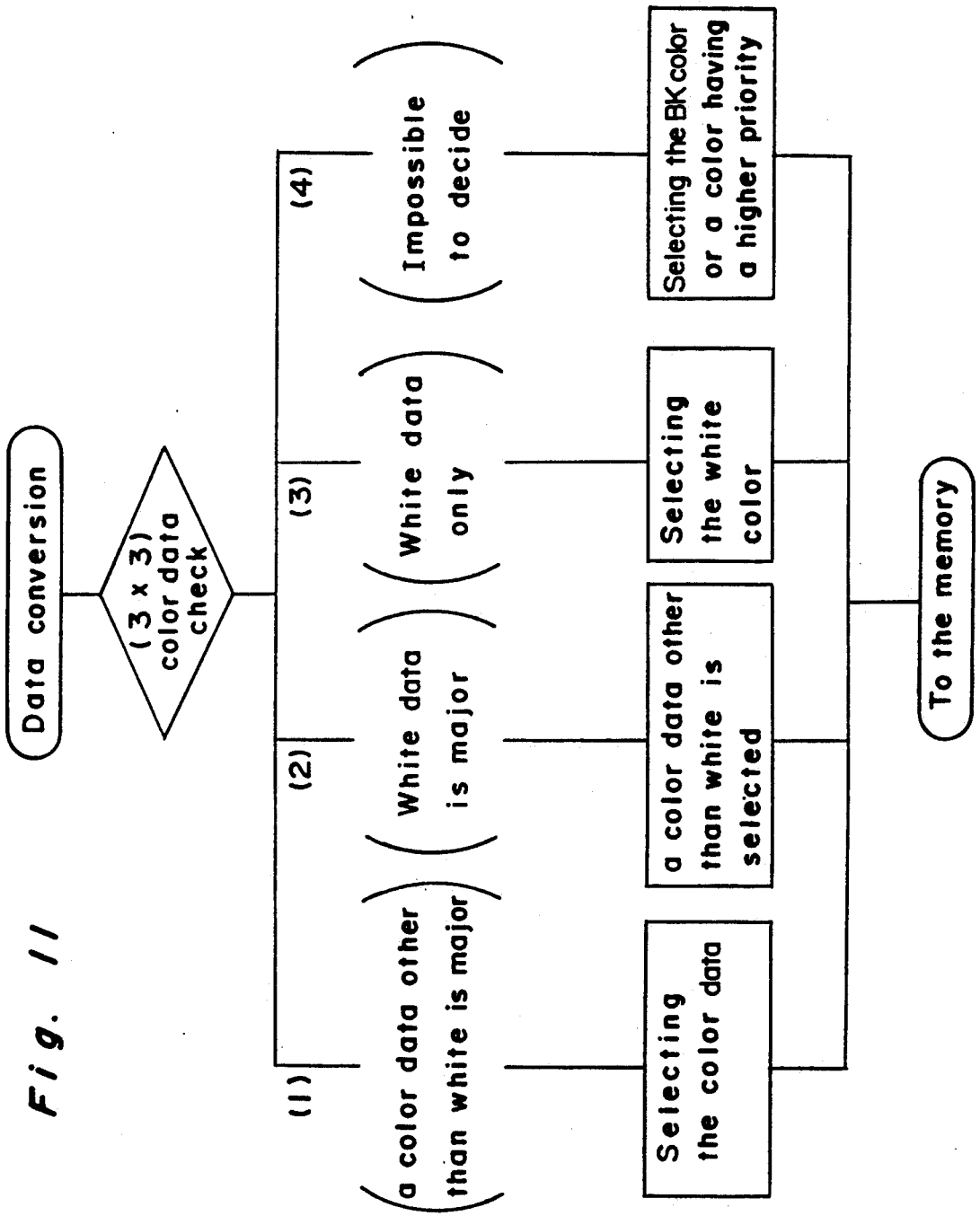
FIG. 11 is a flow chart showing a color data conversion method according to the present invention.
Figures 1, 11:
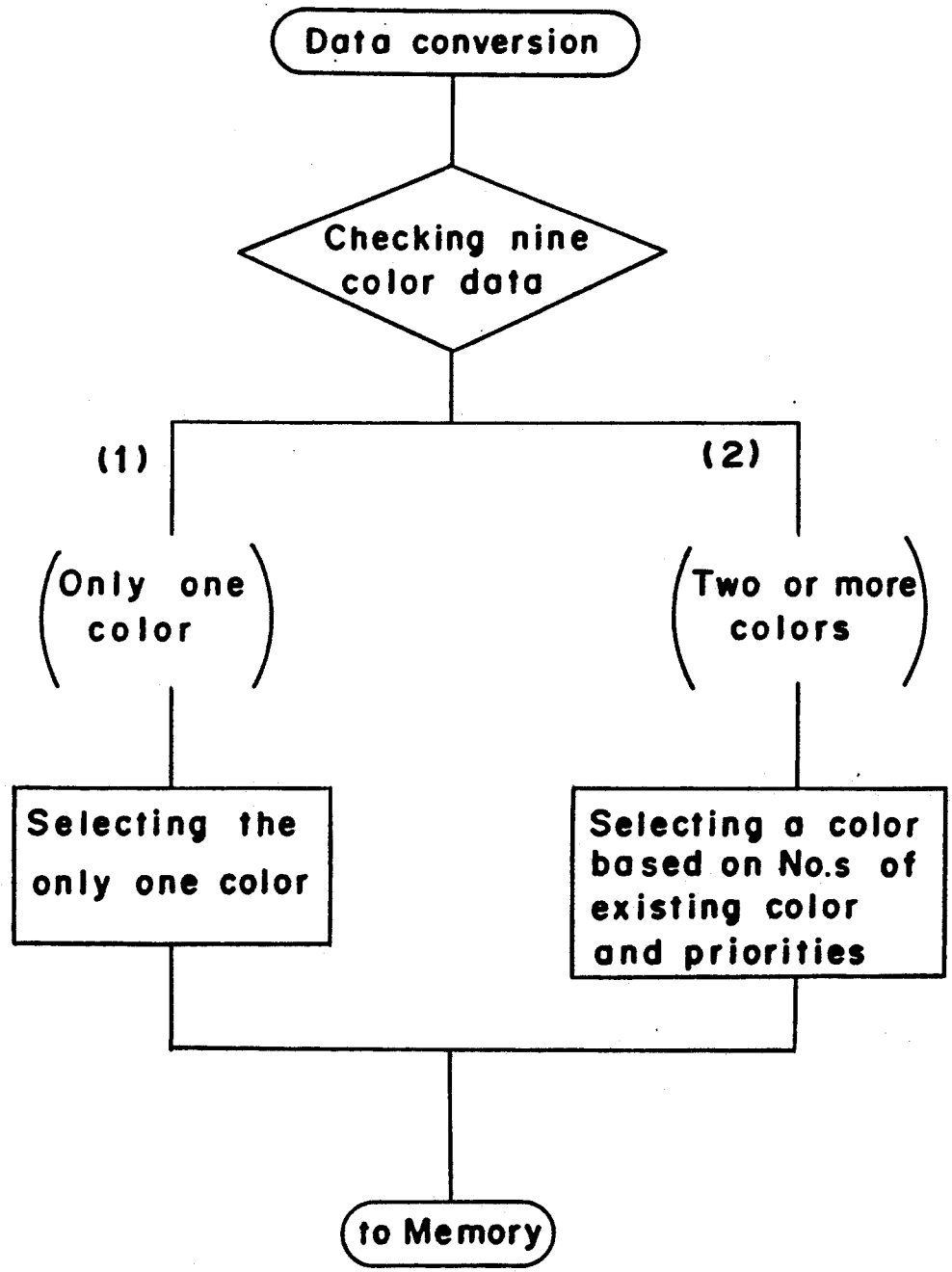
Figures 2, 11:
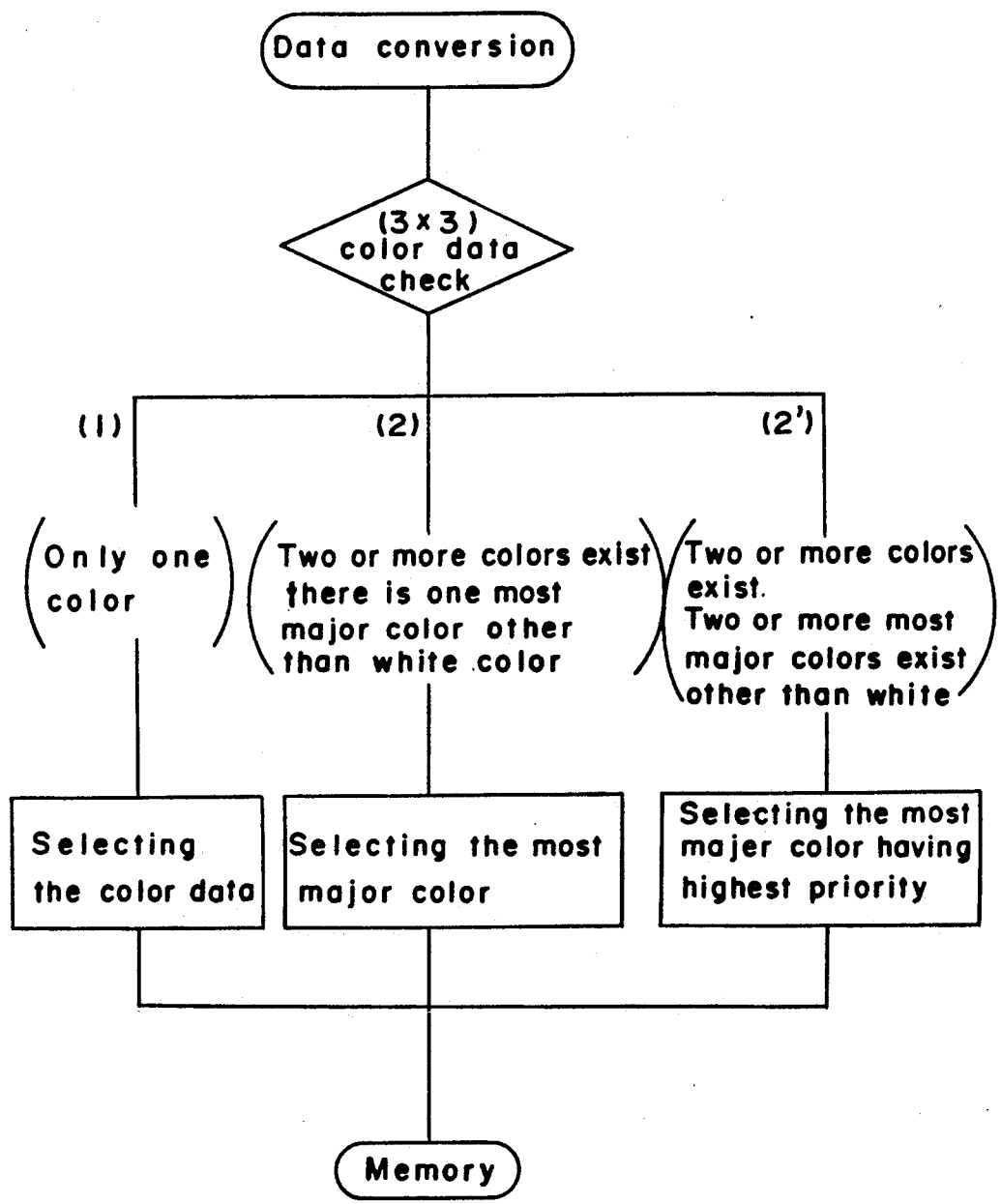

FIG. 11 is a flow chart showing the calculation method.

At first, 3×3 color data in the reading unit of the color CCD are checked to classify them into four cases as follows;

Case (1) in which a certain color data other than the white data is the majority;

Case (2) in which a certain color data other than the white data can be selected as a majority although the white data is major;

Case (3) in which all color data are white data;

Case (4) in which it is impossible to select a certain color data other than the white data as a major one although the white data is minor or it is impossible to select a certain color data as a major one among color data other than the white data being major.

In the case (1), the color of the most major color data is assigned to the color of the color data in the unit of erasing and is memorized in the memory.

In the case (2), the color of the major color data other than the white data is selected as the erasing color data to memorize it in the memory.

In the case (3), the white color is selected as the erasing color data to memorize it in the memory.

In the case (4), namely in the case that a variety of color data are included, the black color is selected as the erasing color data since it seems not so unnatural for the human eye. Alternatively, if color data having a similar hue, for instance red and magenta, are mainly existing, a color is selected among them according to the ranks of priority which are given beforehand.

As is apparent from these four cases, the rank of priority of white color is assigned to the lowest one since any latent image corresponding to the white data is not formed upon exposing the photoconductive drum 3. Contrary to the above, if a higher rank of priority is given to the white color, it is selected as the erasing color data in the cases (1), (2) and (4). This invites lack of image information inconveniently.

Figure 12A:
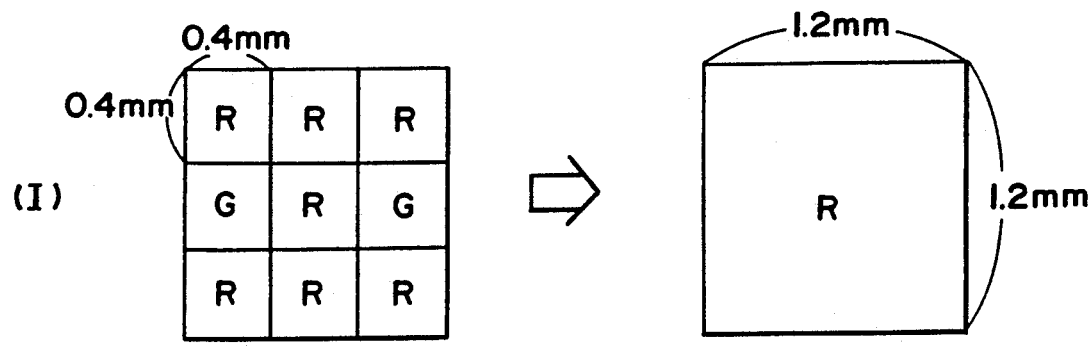
FIGS. 12(a)–12(d) shows examples of color data conversion according to the color data conversion method shown in FIG. 11.
Figure 12B:
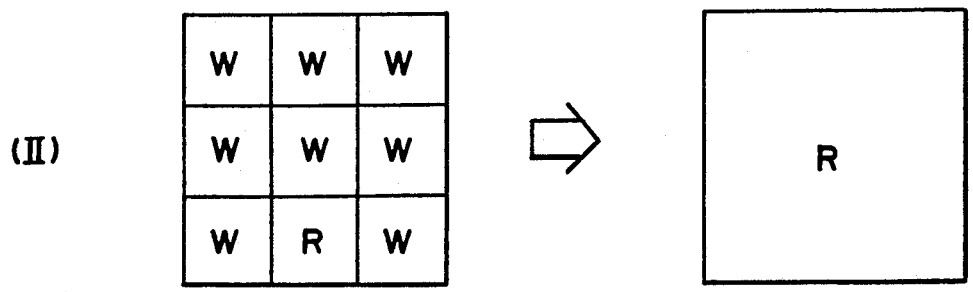
Figure 12C:
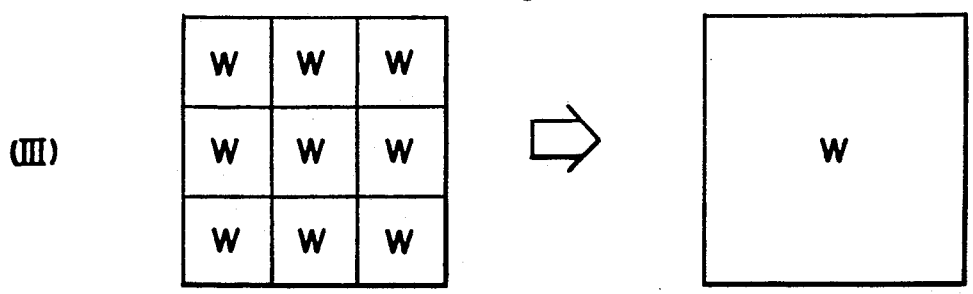
Figure 12D:
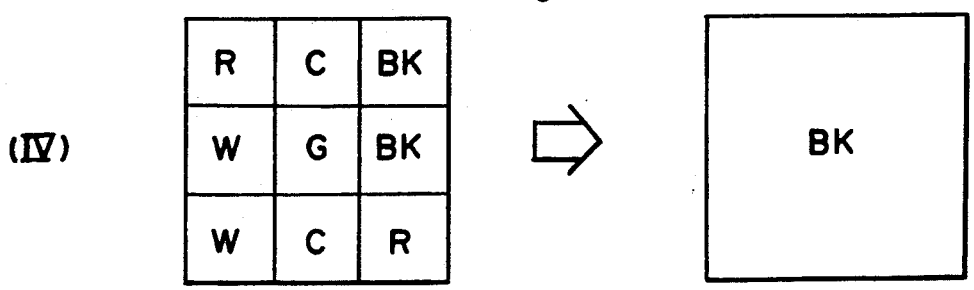
Figures 1A, 12:
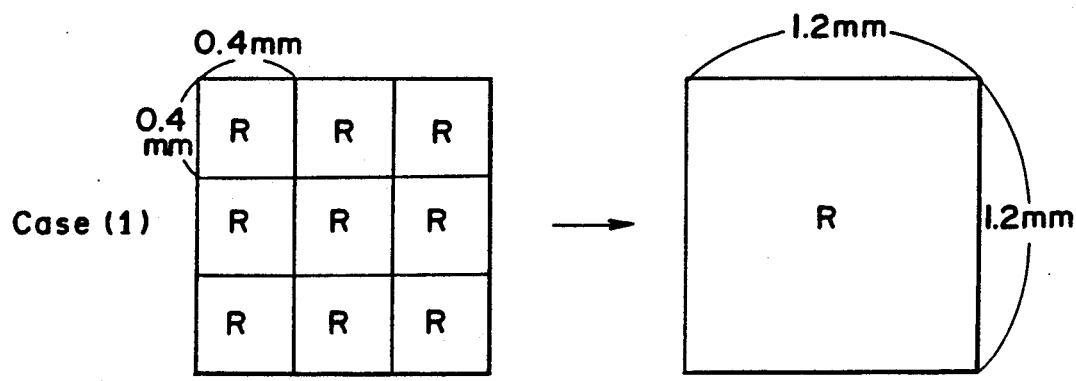
FIGS. 12-1(a)–12-1(c) and 12-2(a)–12-2(d) show examples of color conversion methods shown in FIGS. 11-1 and 11-2, respectively.
Figures 1B, 12:
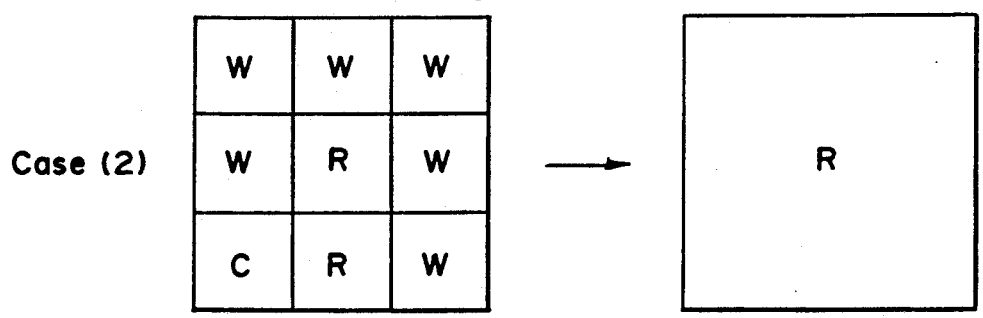
Figures 1C, 12:
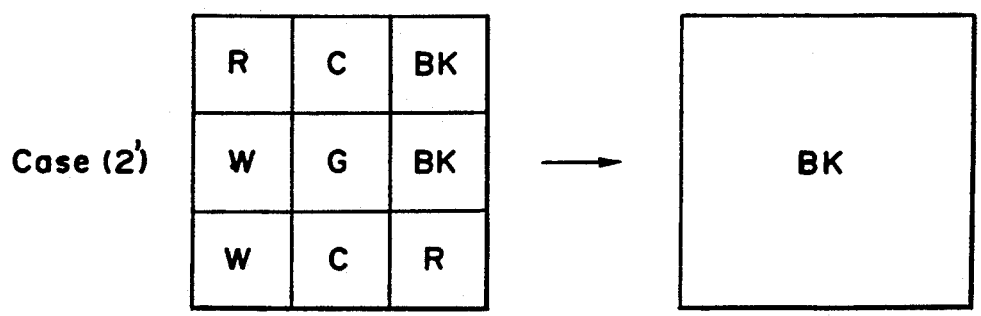
Figures 2A, 12:
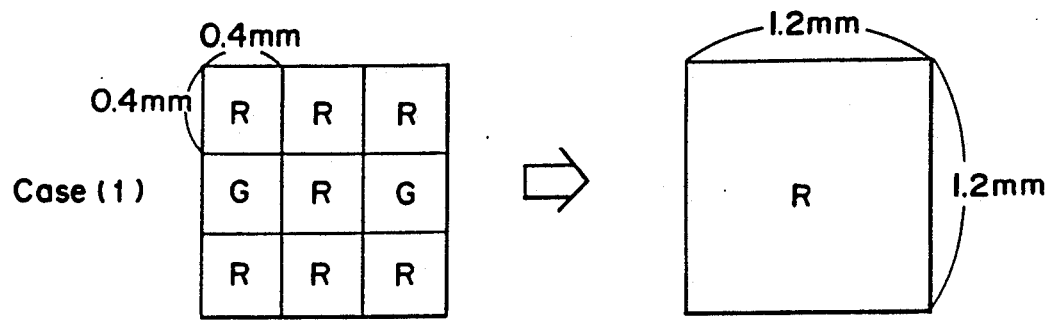
Figures 2B, 12:
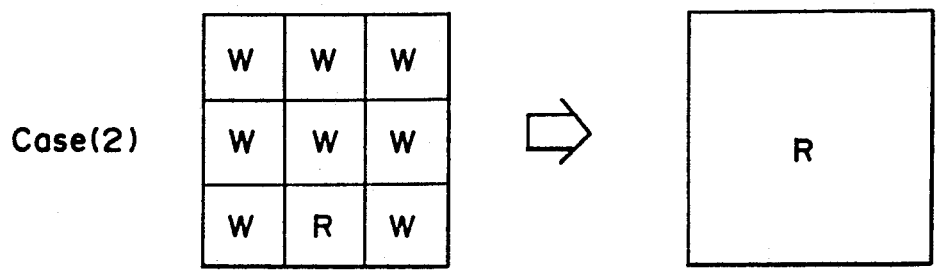
Figures 2C, 12:
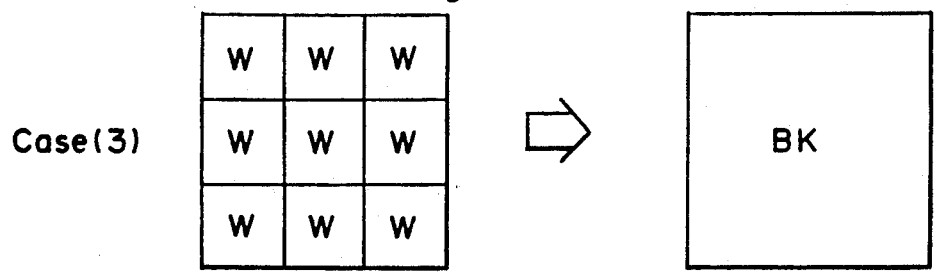
Figures 2D, 12:
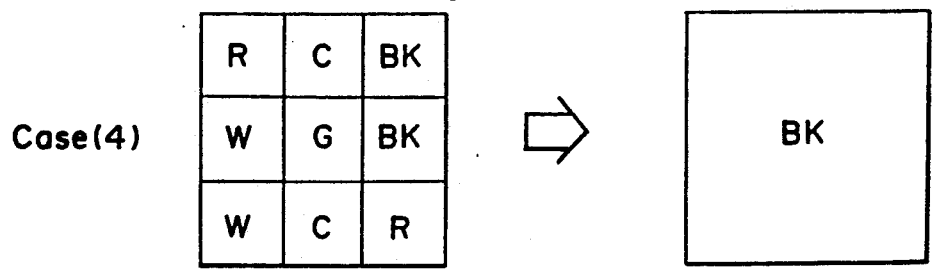
Figures 3, 12:
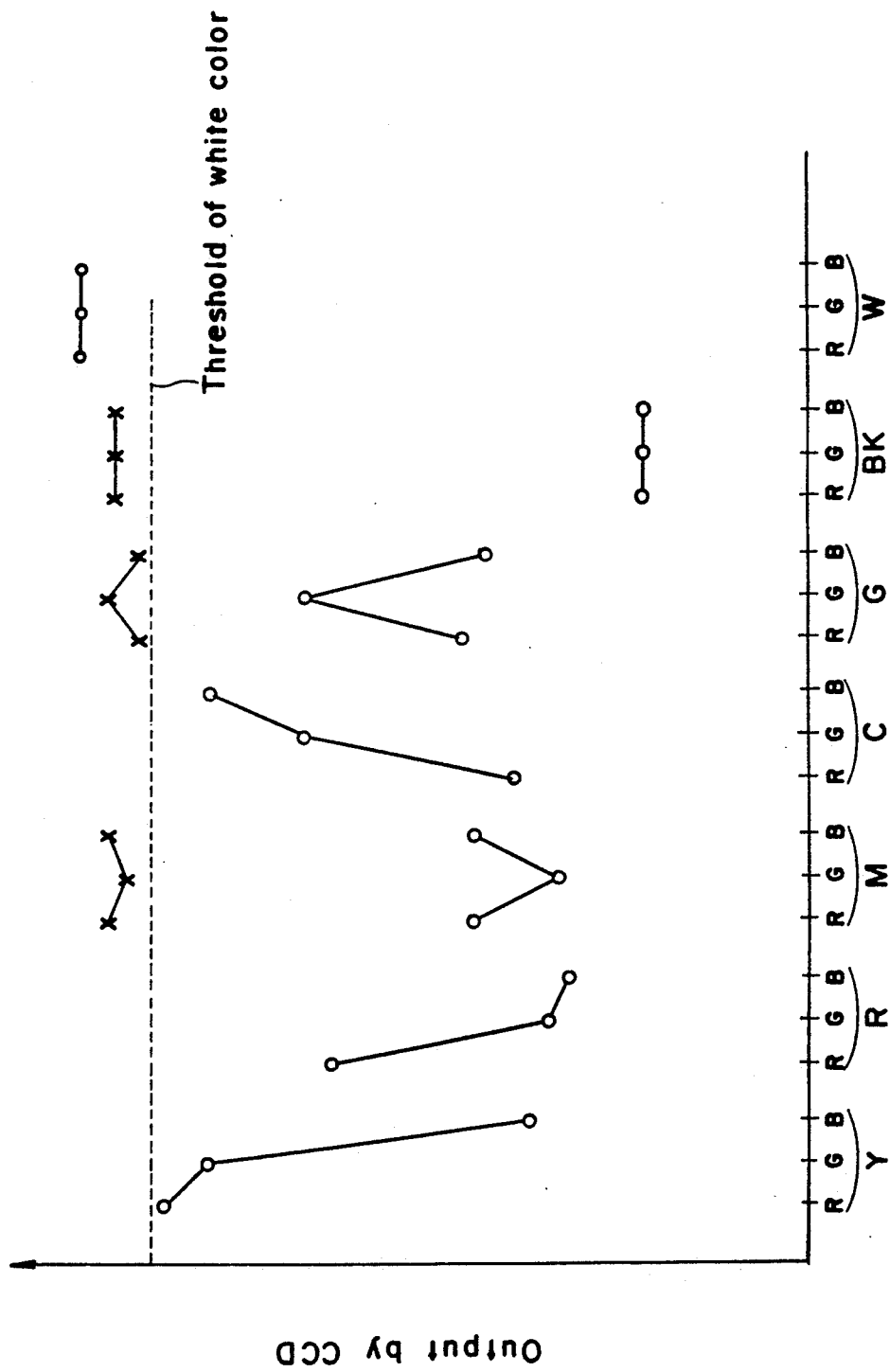
Figures 13, 14A, 14B:
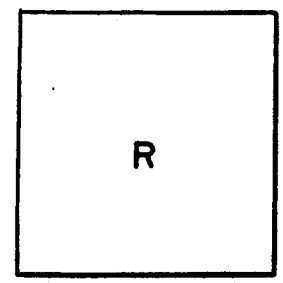
FIG. 13 is an example of data color conversion from color data obtained by a CCD array to a color data for erasing.
FIGS. 14(a) and 14(b) are explanatory views showing a composition and an example of color data according to the present invention.

FIGS. 12 and 13 show concrete examples of the color data conversion regarding the cases (1) to (4).

In the example (I) of FIG. 12, the red color is selected as the erasing color data since the red color data is most major among nine color data. In the example (II) of FIG. 12, since the red color data is major next to the white color data, the red color is selected as the erasing color data.

In the example (III) of FIG. 12, since all nine color data are white, the white color is selected as the erasing color data.

In the example (IV) of FIG. 12, since nine color data are various and similar hue colors are not included therein, the black color is selected as the erasing color data.

In the example shown in FIG. 13, the red and magenta color data having a similar hue are existing mixedly among the nine color data. If the rank of priority of the red color is higher than that of the magenta color, the red color is selected as the erasing color data.

In the conversion method mentioned above, the erasing color data is determined according to the majority principle except for the white data. However, it is also possible to give proper weights to seven colors. In this case, the color of the erasing color data is determined considering individual numbers and weights of the color data.

Next, an example for giving ranks of priority will be explained.

They are given as follows by considering facts that the rank of priority of the white color should be lowest and that impression forces of individual colors sensed by the human eye are usually considered to be an order of black > red > cyan > green > yellow taking into consideration of the actual developing property of respective colors by an output means such as a plotter, printer, marker or the like.

| | | |
|---|---|---|
| 1 ... | Black | (BK) |
| 2 ... | Red | (R) |
| 3 ... | Cyan | (C) |
| 4 ... | Green | (G) |
| 5 ... | Yellow | (Y) |
| 6 ... | Magenta | (M) |
| 7 ... | White | (W) |

Variations in the data conversion

Variation I

In the variation I, the nine color data in the unit of reading are classified into two cases (1) and (2) as shown in FIG. 11-1.

In the case (1) wherein nine color data have only one color commonly, the color is assigned as the erasing data color. In the case (2) wherein two or more colors are included, the erasing data color is determined based on respective numbers of existing colors and ranks of priority of them.

Variation II

In the variation II, shown in FIG. 11-2, the nine color data in the unit of reading are classified into three cases (1), (2) and (3) as follows;

Case (1) in which only one color exists;

Case (2) in which two or more colors are included and the most major color is one kind except for the white color;

Case (2') in which two or more colors are included and the number of the most major color is two or more.

In the case (1), the erasing color data is determined to be the only one color.

In the case (2), the most major color is selected as the erasing color data. Further, in the case (2'), a most major color having the highest rank of priority among the existing most major colors is selected as the erasing color data.

FIG. 12-1 shows concrete examples of the data conversion according to the variation II.

In the case (1), all color data are red and, therefore, the erasing color data is determined to be red.

In the case (2), the most major color is red except for the white data and, therefore, the erasing color data is determined to be red. Further, in the case (2'), most major colors are black, red, cyon and white. The black color has the highest rank of priority among seven colors, as stated already, and, therefore, the erasing color data is determined to be black.

Variation III

FIG. 11-3 shows the data conversion according to the variation III of the present preferred embodiment.

In the data conversion, the nine color data are checked to classify them into four cases as follows;

Case (1) in which a color data other than the white data is major among them;

Case (2) a certain color data other than the white data can be selected as a majority although the white data is major the white color data is major;

Case (3) in which all color data are white;

Case (4) in which a variety of color data are existing and, therefore, it is impossible to determine the erasing color data among them.

In the case (1), the major color is determined as the erasing color data. In the case (2), the major data is selectively determined among the color data except for the white data.

In the case (3), two situations are considered. The first one is that all color data having been read are pure white. The second one is that the area of a document corresponding to the unit of erasing contains a very light color and, therefore, all color data are determined to be white in the color discriminating process.

In the case (3), the black color is selected as the erasing color data.

In the first situation, no latent image to be developed is formed and, therefore, no toner image is formed in the developing process using the black toner.

In the second situation, a latent image having a low voltage is formed and, therefore, it is developed at a low density by the black toner. Thus, the latent image is visualized in a gray color.

In the case (4), namely, in the case that a variety of color data are included, the black color is selected as the erasing color data since it seems not so unnatural for the human eye. Alternatively, if color data having a similar hue, for instance, red and magenta, are major, a color is selected among them according to the ranks of priority regarding them which are given beforehand.

In FIG. 12-2, concrete examples of the data conversion according to the variation IV.

The essential feature of the variation IV is indicated in the case (3). In this case (3), all color data are white but the black color is selected as the erasing color data. This is due to the reason mentioned above and will be explained more concretely referring to FIG. 12-3.

In the color discrimination process, each color is identified using relative and absolute values of R, G and B output signals outputted from the color CCD. However, upon identification of respective color, threshold values to these output signals are introduced in order to avoid errors due to limitations on the sensitivity of the color CCD and fluctuations among output signals outputted therefrom.

In FIG. 12-3, R, G and B output signals corresponding to each color are shown.

For each of the colors, each line connecting three small circles denotes R . G . B . outputs for predetermined standard brightness and each line connecting three (x) denotes that for very low brightness. As shown therein, R, G and B output signals of each color having a very low density have very high levels comparative to those of the white color having the standard density. Accordingly, assuming that a dotted line denotes a threshold regarding the standard white color, light magenta, green and black colors are identified erroneously as the white color.

If such an erroneous color identification is made, the corresponding latent image is not erased in each developing process and, therefore, it is developed with all color toners resulting in a dirty copy. This is the reason why the black color is chosen in the case (3).

FIG. 14 shows a composition of the color data of the erasing unit used in the data converting section and, in this composition, each color data is represented by a data of four bits. These four bits B3, B2, B1 and B0 are assigned one to one to the first to the fourth developing units 7 to 10, respectively. The bit of "1" indicates to turn on the corresponding LED and the bit of "0" indicates to turn off the same. In the example shown in FIG. 14 (b), upper two bits are "0" and lower two bits are "1". Namely, in this case, since the bit B3 corresponding to the first developing unit 7 is zero upon activating the same, the latent image on the drum 3 corresponding thereto is not erased and is visualized by the yellow toner to transfer the yellow toner image onto the transferring belt 15. Similarly, the latent image is visualized by the magenta toner in the second developing process by the second developing unit 8 since the latent image is not erased. This magenta toner image is superimposed onto the yellow toner image having been transferred to the transferring belt 15. As the result of the superimposition, a red toner image is formed on the belt 15. Since the LED is turned on in both the third and fourth developing processes, the corresponding toner image is erased by the LED and, therefore, is not developed by the cyan toner and the black toner.

According to this data composition, the ECP 58 can control the editing eraser 5 by searching individual states of bits composing each color data. Therefore, it can respond quickly.

FIG. 15(a) to 15(d) show portions of flow charts of yellow, magenta, cyan and black image forming processes in each of which only LED control is shown.

In the yellow image forming process shown in FIG. 15(a), it is checked whether or not the bit B3 of the color data is zero at step S1 and, if it is zero, the LED is turned off at step S2 in order not to erase a latent image corresponding to the yellow color. If it is not zero, the LED is turned on at step S3 in order to erase the latent image.

In the magenta image forming process shown in FIG. 15(b), it is checked whether or not the bit B2 of the color data is zero at step S4 and, if it is zero, the LED is turned off at step S5. If it is not zero, the LED is turned on at step S6.

In the cyan image forming process shown in FIG. 15(c), it is checked whether or not the bit B1 of the color data is zero at step S7 and, if it is zero, the LED is turned off at step S8. If it is not zero, the LED is turned on at step S9.

In the black image forming process shown in FIG. 15(d), it is checked whether or not the bit B0 of the color data is zero at step S10 and, if it is zero, the LED is turned off at step S11. If it is not zero, the LED is turned on at step S12.

Thus, the control of the LED is simplified.

In FIGS. 16(a) to 16(d), counter parts of the yellow, magenta, cyan and black image forming processes in which the color data as shown in FIG. 9 are used are shown for comparison.

FIG. 16(a) is a flow chart of the yellow image forming process.

The developing process using the yellow toner is needed for color data of yellow, green and red colors and the white color is also included in the color decision since it is unnecessary to erase a latent image corresponding to the white data.

In the color decision from step S100 to step S103, it is checked whether or not the color data is yellow, green, red or white. If it is either one of these four colors, the LED is turned on at step S104 in order to maintain the corresponding latent image. If it is neither one of them, the LED is turned on at step S105 in order to erase the latent image.

FIG. 16(b) in flow chart of the magenta image forming process.

The developing process using the magenta toner is needed for color data of magenta and red colors and the white color is also included in the color decision.

In the color decision from step S110 to step S112, it is checked whether or not the color data is magenta, red or white and, if it is either one of these three colors, the LED is turned off at step S113. If it is neither of them, the LED is turned on at step S114.

FIG. 16(b) is a flow chart of the magenta image forming process.

The developing process using the cyan toner is needed for the color data of cyan and green colors and the white color is also included in the color decision.

From step S120 to step S122, it is checked whether or not the color data is cyan, green or white. If it is YES at either of these steps, the LED is turned off at step S123. If it is neither of these three colors, the LED is turned off at step 124.

Figure 16D:
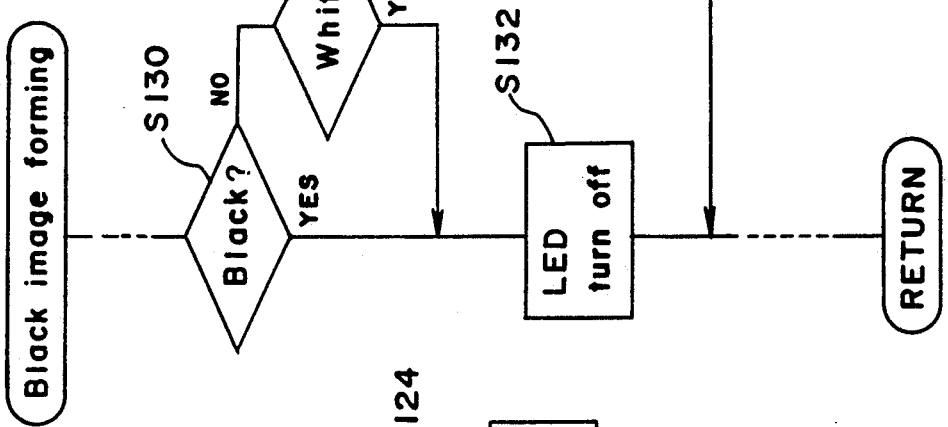
Figure 16C:
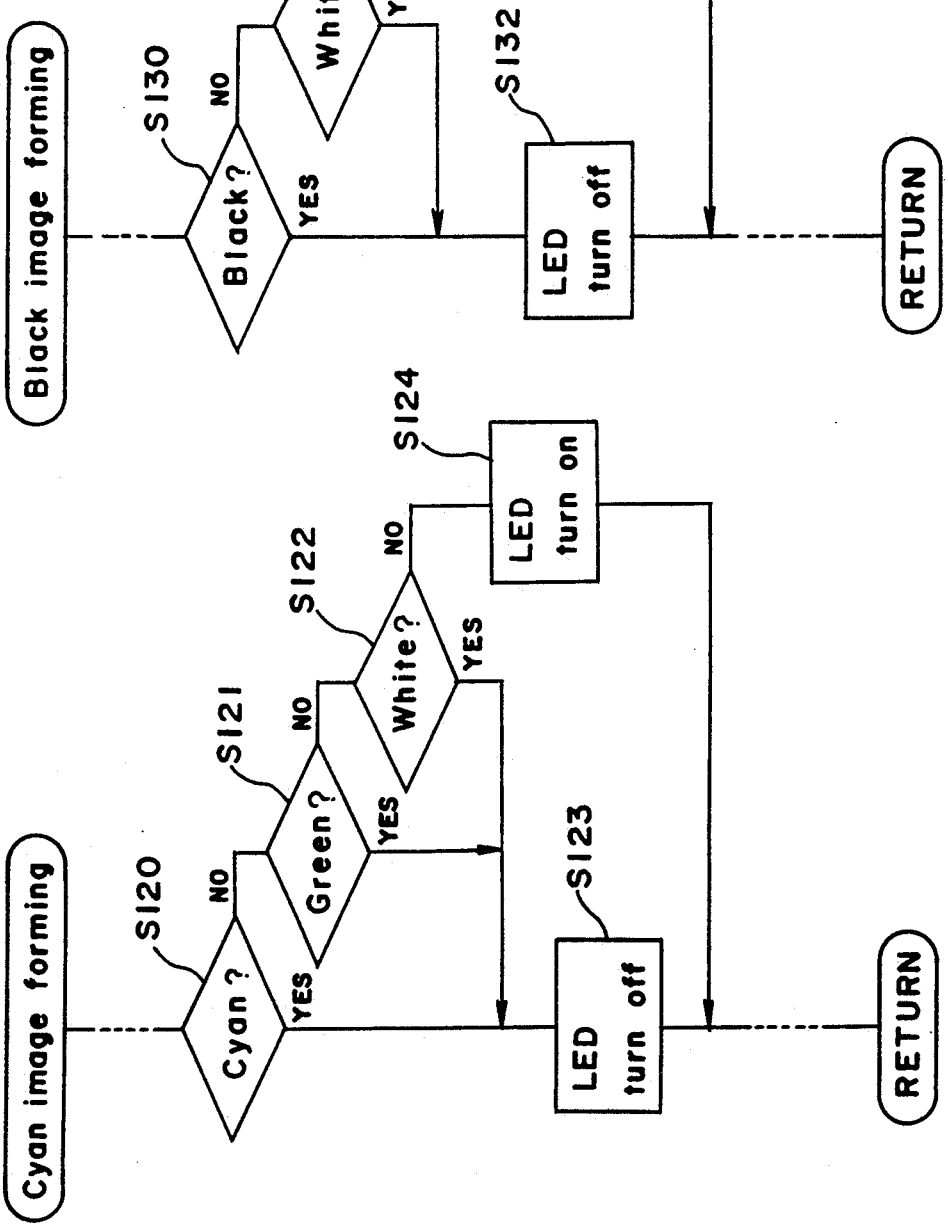

FIG. 16(d) shows the developing process using the black toner. This process is needed only for the black data but the white color is included in the color decision.

At steps S130 and S131, it is checked whether or not the color data is black or white and, if it is so, the LED is turned off at step S132. If it is neither of them, the LED is turned on at step S133.

Thus, many steps become necessary when a conventional structure of the color data is employed.

Principle of Data reconversion

As is well known to those skilled in the art, a light beam emitted from each LED 65 of the editing eraser 5 has such a distribution that the light amount of the central portion thereof is large but that of the peripheral portion thereof is reduced gradually as goes to the outer area. Due to the distribution of light, the whole area of the erasing unit is not erased perfectly only by turning on the LED 65 and a ripple of the light amount is enhanced to cause an erroneous erase. In order to avoid these inconveniences, it becomes necessary to compensate the light amount at the peripheral portion of the erasing unit by superimposing the light beams emitted by adjacent LEDs.

FIG. 17 is an explanative view for explaining the light superimposition for a perfect erase. In the following, the explanation is limited to the main scan direction for brevity.

Figure 17A:
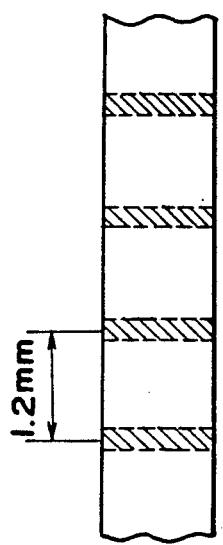
FIGS. 17(a), 17(b) and 17(c) are explanatory views for showing light distribution by LEDs.

FIG. 17(a) shows a distribution of the light on the photoconductive drum 3 which is emitted from individual LEDs having an erasing pitch of 1.2 mms. Each hatched area indicates an area on which respective light beams from the adjacent LEDs are superimposed when all LEDs are turned on.

Figure 17B:
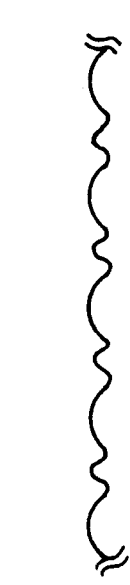

FIG. 17(b) shows the distribution of light on the photoconductive drum 3. As shown therein, it is understood that the light amount at the superimposed area is strengthened to a level same to that of the central portion of each LED.

Figure 17C:
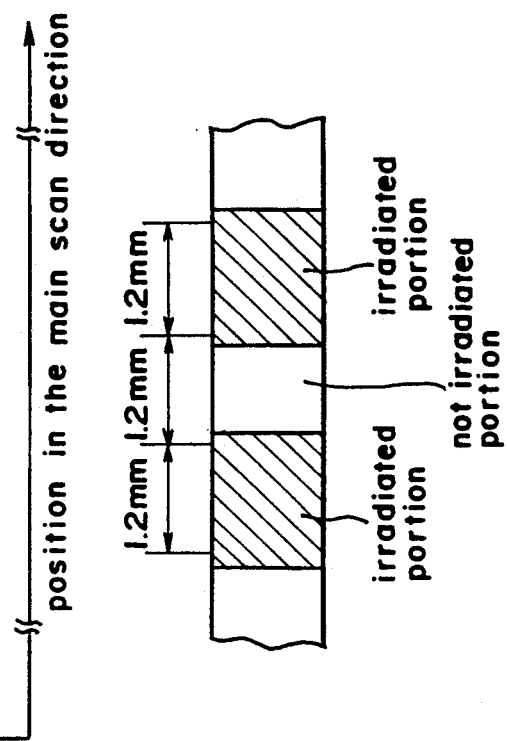

FIG. 17(c) shows portions on the drum irradiated and not irradiated when LEDs are turned on every other LED. In this case, it is understood that the area of the irradiated portion is lager than those of the not irradiated portion and the ideal erase pitch.

Due to this phenomena, edge portions not to be erased are apt to be erased. This causes lack and change of the image information and the reproduction power is worsened.

FIG. 18 shows such an unfavorable example. The block (a) shows a portion of a document corresponding to (3 ×3) erasing units and the block (b) shows 3×3 color data in the erasing unit.

As shown therein, there is a black data in the center of the block and eight magenta data are surrounding therearound.

The image forming operation is done using the color data shown in the block (b). At first, the area corresponding to the black data is erased in the developing process by the second (magenta toner) developing unit 8. However, as stated above, the LED irradiates an area larger than the unit area to be erased thereby.

The block (c) of FIG. 18 shows a toner image obtained by developing the corresponding latent image using the magenta toner. The area irradiated to erase the black which is larger than the actual area of the erasing unit is indicated by an indication of "no image" in the block (c).

Next, in the developing process using the black toner, the magenta data are erased by irradiating the magenta area surrounding the black area. As indicated in the block (d), the black area to be developed with the black toner is narrowed by the irradiation of light. Namely, the area of "no image" is enlarged but the area to be visualized by the black toner becomes smaller than that of the document to be reproduced.

The block (e) shows a superimposed state of the magenta toner image and the black toner image transferred onto the transferring belt 15. As indicated by a hatched area, a rectangular blank portion is formed between the black toner image and the magenta toner image. As stated above, it is impossible conventionally to avoid lacks and/or defects of the image information of the document due to the radiation property of the LED.

Figure 19:
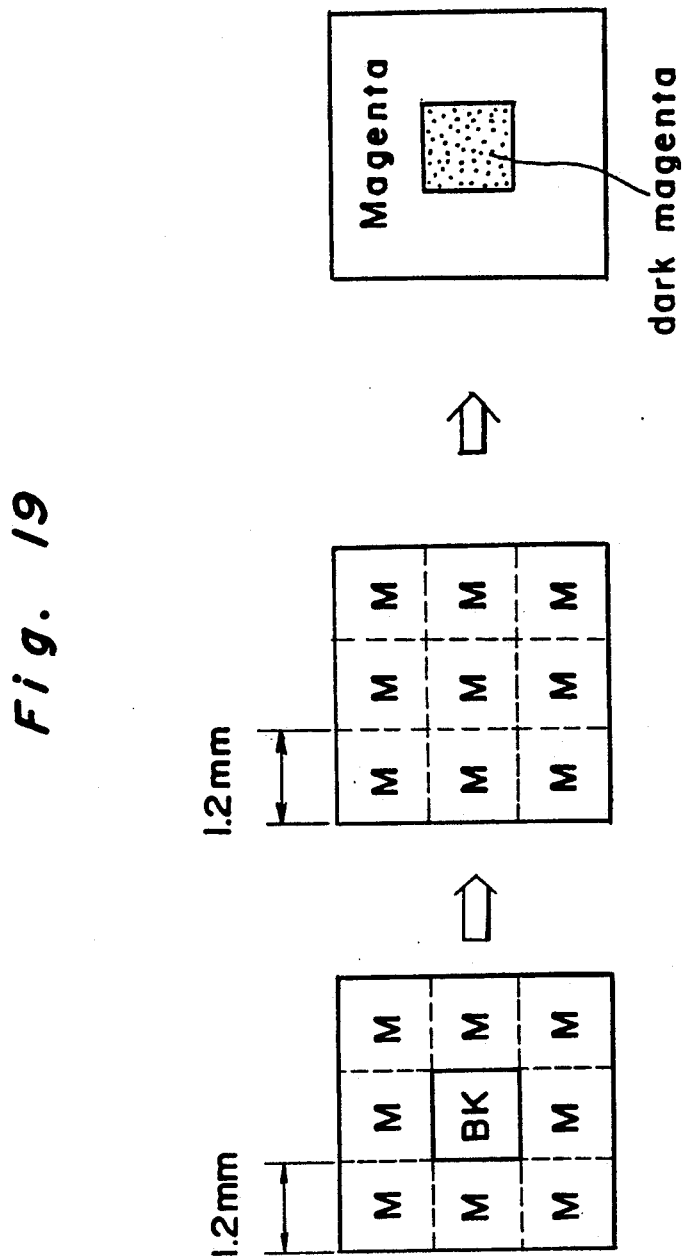
FIG. 19 shows an example of data reconversion method according to the present invention.
Figure 20A:
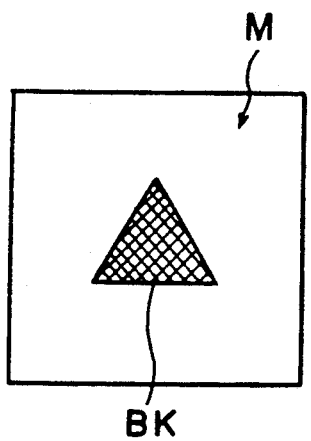
FIG. 20(a)-20(f) shows another example of an image defect and the data reconversion method.
Figure 20B:
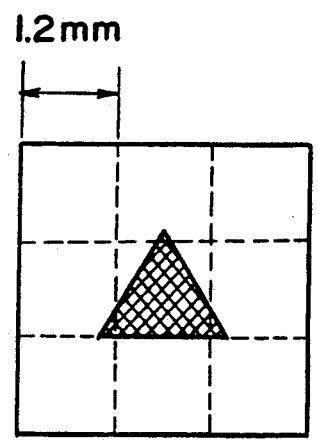
Figure 20C:
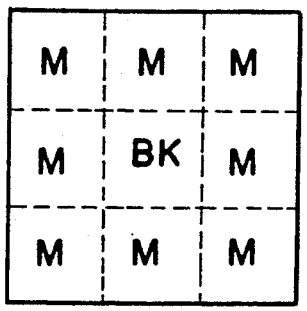
Figure 20D:
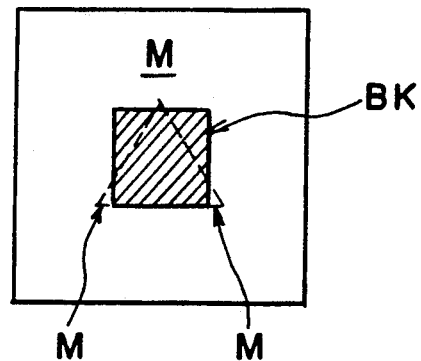
Figure 20E:
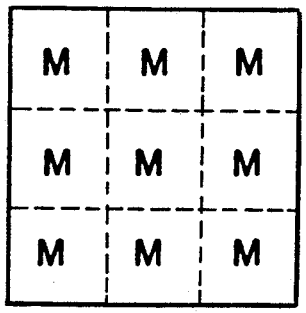
Figure 20F:
Figure 22A:
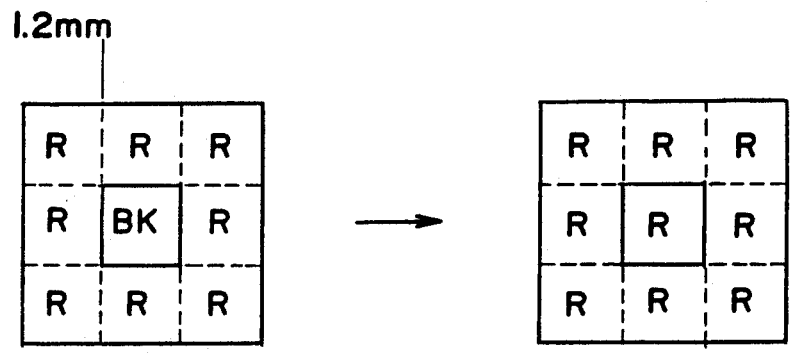
FIG. 22(a)-22(e) shows examples of the data reconversion method shon in FIG. 21.
Figure 22B:
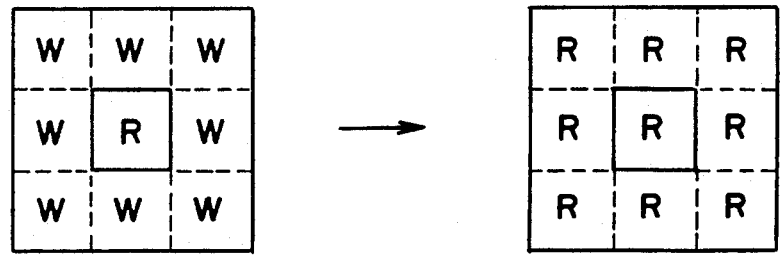
Figure 22C:
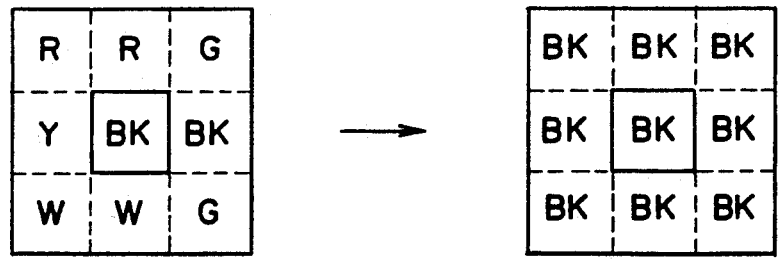
Figure 22D:
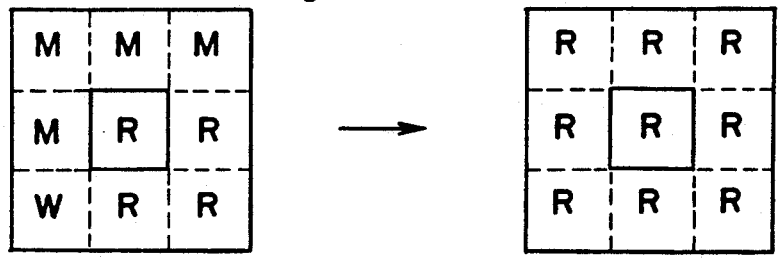
Figure 22E:
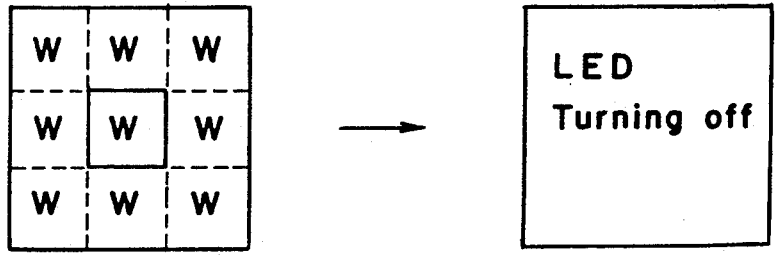

According to the present invention, this problem is solved in a manner as shown in FIG. 19.

In the manner according to the present invention, the central black data is converted to a magenta data in order to avoid such an unnecessary erase as mentioned above. Accordingly, the central unit data is developed with the magenta toner. However, it is developed at a toner density greater than that of the other area because the voltage of the latent image corresponding to the black area becomes higher than that of the latent image surrounding the former latent image.

Thus, at least lacks or defects regarding the configurations of the image information can be avoided although the black color is changed to the magenta color. Further, since the change in the color is limited to a small area when compared to the whole area of the document, it does not give any unnatural impressions.

FIG. 20 shows an example of change in the image information caused due to the fact that the pitch of erase by the editing eraser is larger than the pitch of reading by the CCD array. Hereafter, the radiation property of each LED of the editing eraser is assumed to be ideal.

The block (a) of FIG. 20 shows a portion of a document to be read. There is a black triangle in the center of the portion and the other portion thereof is magenta.

In the block (b) of FIG. 20, the portion is sectioned into (3×3) erasing units. The color data converted in the erasing unit as indicated by the block (c) of FIG. 20 shall produce the final toner image visualized using the magenta and black toners as shown in the block (d) of FIG. 20. As is apparent from the block (d), the original black triangle is changed to a black rectangle. This indicates that the information regarding configurations on a document has been changed during the copying process. This is undesirable for the copying machine.

As shown in the block (e) of FIG. 20, according to data reconversion method of the present invention, the central black data of the block (c) is converted to the magenta color. By this color conversion, the original black triangle is reproduced as a magenta triangle having a density greater than that of the other portion, as shown in the block (f) of FIG. 20.

This color conversion method utilizes the same principle as that of the example shown in FIG. 19. Namely, there is utilized the fact that the latent image corresponding to the black portion has a voltage higher than that of the magenta portion. If the triangle is yellow, it is visualized as a magenta triangle with a density smaller than that of the other portion.

Thus, according to the data reconversion method of the present invention, the information regarding configurations can be maintained as it is, although the color information is changed at minor areas.

Method for data reconversion

FIG. 21 shows a flow chart for executing the method for data reconversion.

In the present preferred embodiment, the color data in the unit of erasing are sectioned into blocks of $3 \times 3$ in order for save of the capacity of the memory and the data reconversion is performed every block of $3 \times 3$ erasing units.

At first, nine color data included in a block are checked to classify them into five cases as follows, Case (I) in which a certain color data other than the white data is the majority;

Case (II) in which all color data are white data;

Case (III) in which a certain color data other than the white data can be selected as a majority although the white data is major;

Case (IV) in which two or more color data are major except for the white data and they are not of a similar tone.

Case (V) in which two or more color data are major except for the white data and they are of a similar hue only.

In the case (I), all color data are converted to the major color.

In the case (II), all LEDs corresponding to the white color data are turned off in each of the first to fourth developing processes without any data reconversion since it is unnecessary to erase the latent image corresponding to the white color.

In the case (III), all color data are converted to the major color next to the white color.

In the case (IV), all color data are converted to the black color.

In the case (V), all color data are converted to a color having the highest rank of priority among them as stated regarding the data conversion from the reading unit to the erasing unit.

Referring to FIG. 6, the color data having been converted from the reading unit to the erasing unit are read out from the RAM 227 of the memory 56 by the CPU 232 of the ECP 58 and are further converted according to the data reconversion method. The color data reconverted are stored again in the memory 227. Accordingly, it is not necessary to provide with another memory for the data reconversion. However, another memory can be used therefor.

FIG. 22 shows examples (a) to (e) of the data reconversion according to the present invention.

The example (a) corresponds to the case (I). In the example (a), the central black data, surrounded by eight red data is converted to the red color since the red data is the majority.

In the example (b) corresponding to the case (III), since the red color is major next to the white data, the latter data are converted to the red color.

The example (c) corresponds to the case (IV). As shown therein, each of the red, green and black data is major except for the white data and they are not of a similar hue, all color data are converted to the black color.

In the example (d) corresponding to the case (V), since both red and magenta data are four and have a similar hue, all color data other than the red data are converted to the red color having a higher rank of priority than that of the magenta color.

The example (e) corresponds to the case (II). Since all data are white, all corresponding LEDs are turned off in each developing process.

Limited color detection circuit

Figure 23:
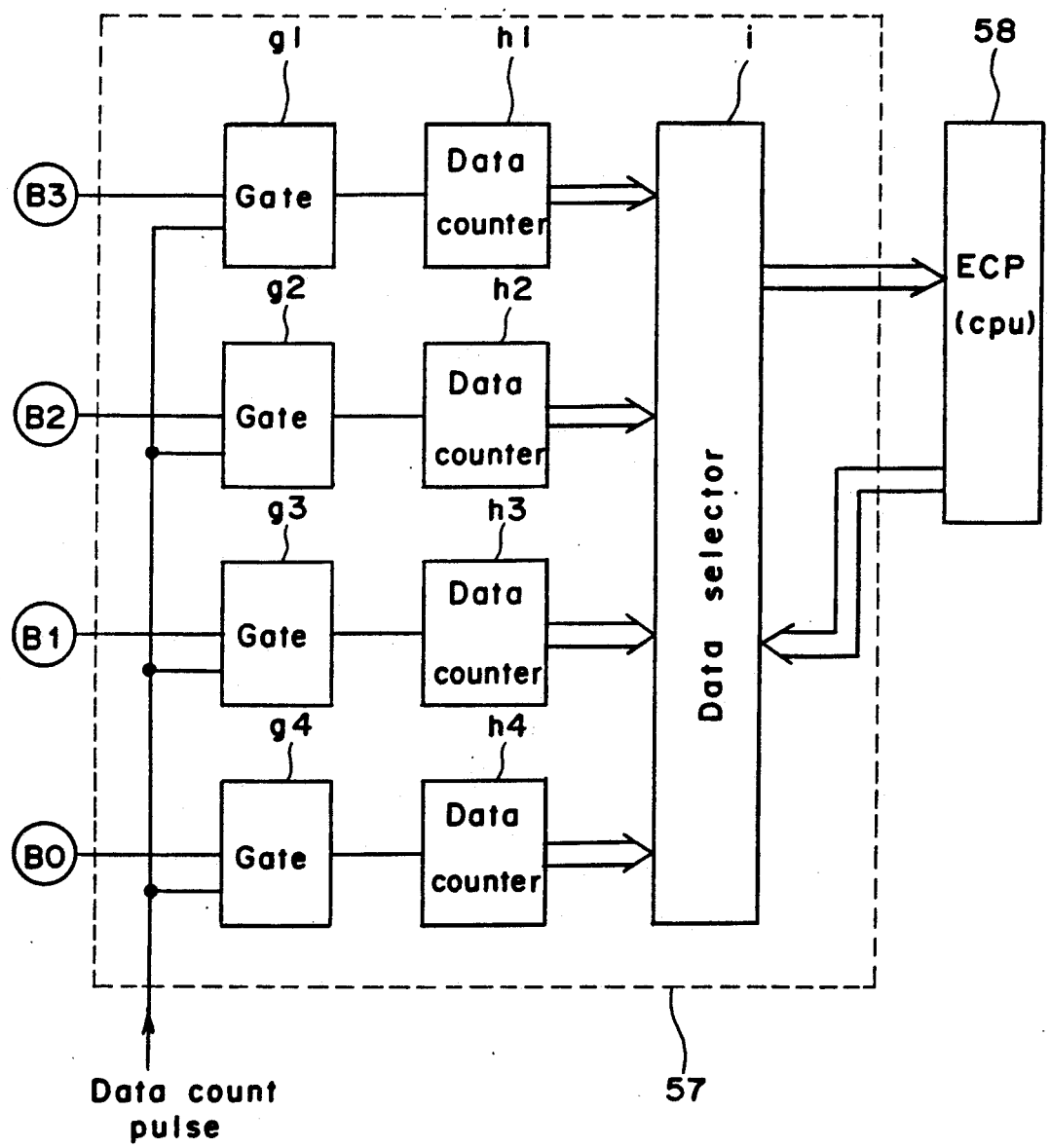
FIG. 23 is a block diagram of limited color detecting circuit.

FIG. 23 shows a block diagram of the limited color detection circuit 57.

The limited color detection circuit 57 is provided for checking colors on a document to be copied beforehand in order to avoid unnecessary developing processes.

In FIG. 23, B3 to B0 indicate individual bits of a color data in the erasing unit, as explained in FIG. 14. Data count pulses are generated in synchronization with the data conversion from the reading unit to the erasing unit and are inputted into respective gates g1 to g4 together with respective bits B3 to B0. Data counters from h1 to h4 are connected to outputs of the gates g1 to g4, respectively. Each gate is opened to output the data count pulse to the connected data counter only when the bit signal is zero. For instance, if the color data is yellow, the corresponding data is given by "0111" and, therefore, only the gate g1 is opened. Accordingly, the corresponding data counter h1 counts the data count pulse. When this counting operation has been performed with respect to all color data in the erasing unit of a document, data are accumulated in respective data counters h1 to h4 from which necessities and unnecessities of individual developing units 7 to 10 can be decided.

After completion of reading a document, the ECP sends signals to a data selector i in order to read out contents of respective data counter h1 to h4 selectively.

If there is at least one data counter content of which is zero, it becomes possible to decide that the developing unit corresponding to the data counter is unnecessary for copying a document. This is the contents of the limited color detection.

If a count value accumulated is not zero but neglectable against the maximum count value, the corresponding developing unit can be decided to be unnecessary.

According to the limited color detection, it becomes possible to shorten the speed of image formation since unnecessary developing process can be omitted efficiently.

Second preferred embodiment

Figure 24:
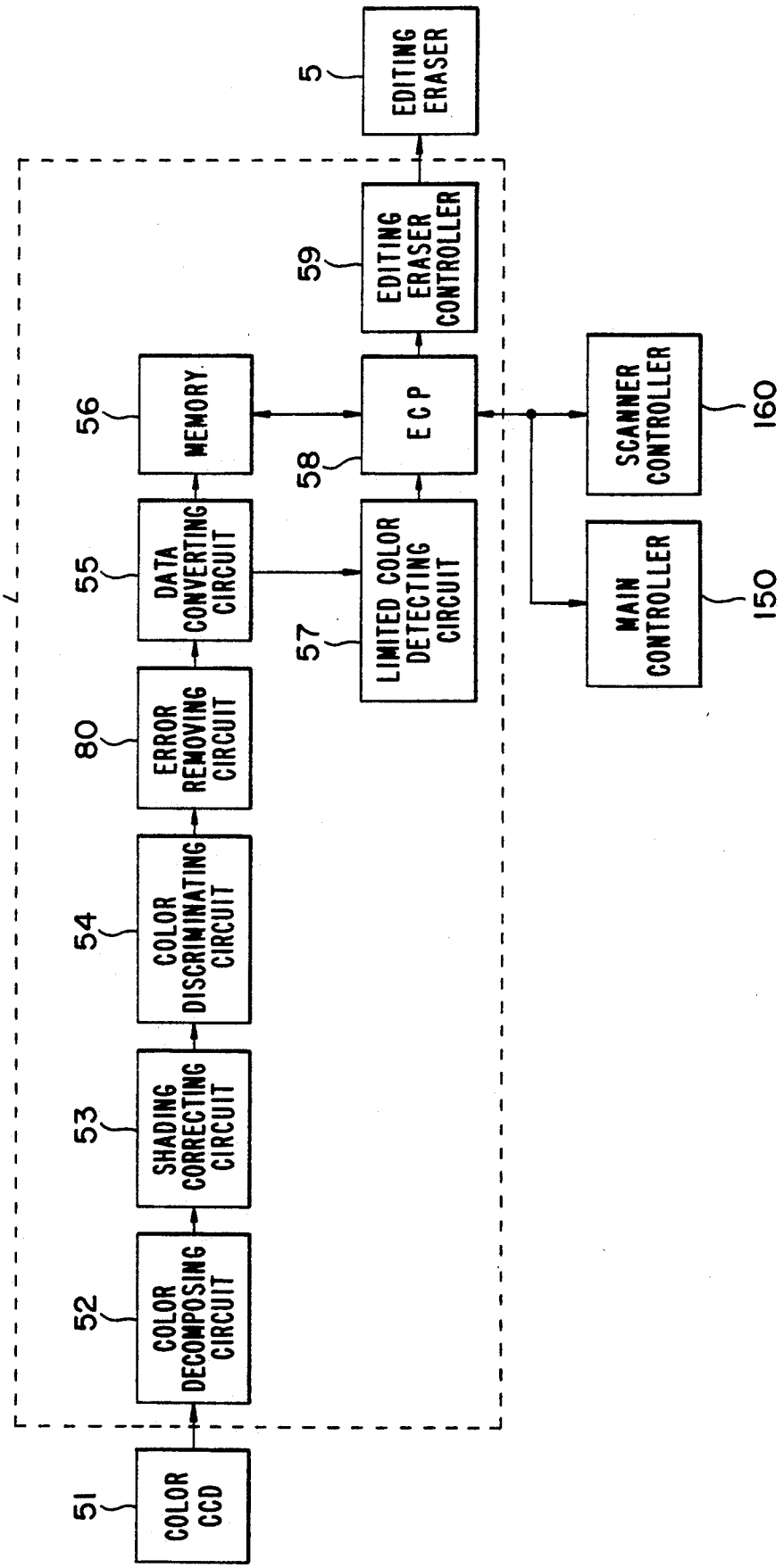
FIG. 24 is a block diagram of data processor according to the second preferred embodiment of the present invention.

FIG. 24 shows a block diagram of a data processing circuit 70 according to the second preferred embodiment of the present invention.

In this preferred embodiment, a processing circuit 80 for removing erroneous color discriminations (hereinafter, referred as the error removing circuit) is provided between the color discriminating circuit 54 and the data converting circuit 55.

Compositions other than the error removing circuit 80 are same as those of the first preferred embodiment shown in FIGS. 6(a) and 6(b).

This error removing circuit 80 is provided for correcting error discriminations caused by the color discriminating circuit 54. Such error discriminations are apt to occur at individual boundaries between two colors.

Figure 25:
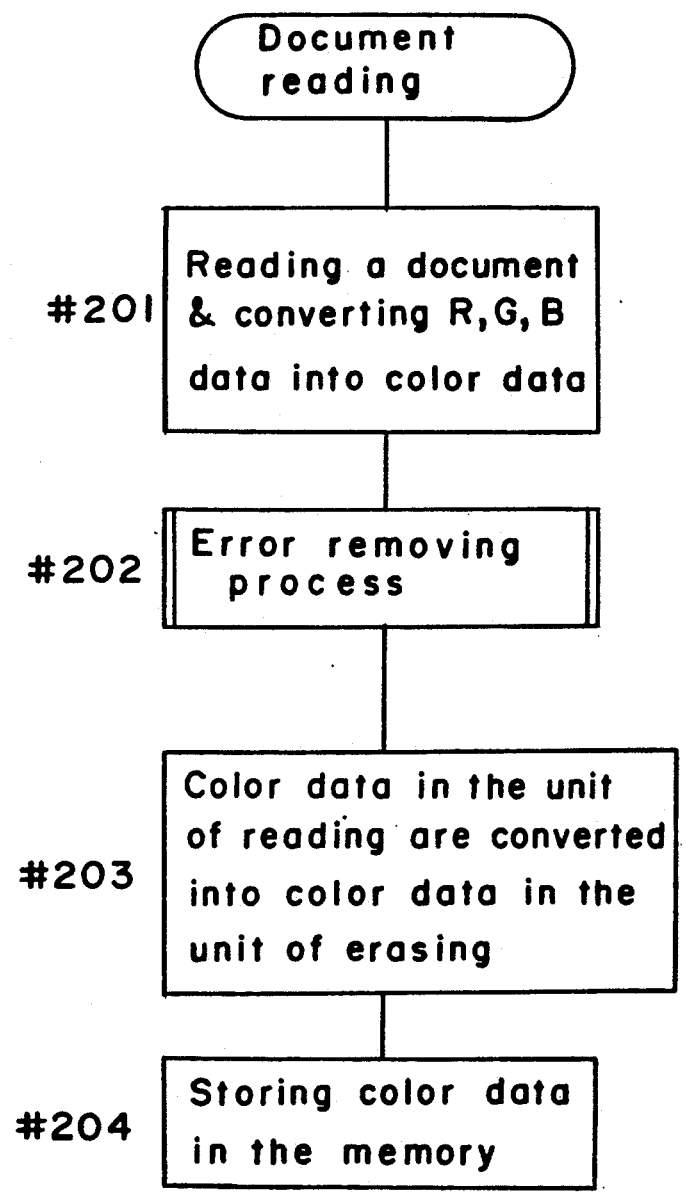
FIG. 25 is a flow chart of a document reading processing according to the second preferred embodiment of the present invention.

FIG. 25 is a flow chart for reading a document which corresponds to that of the first preferred embodiment shown in FIG. 4(a). Steps #201, #203 and #204 of FIG. 25 are same to steps #1, #2 and #3 of FIG. 4(a). In other words, step #202 is newly provided for removing error discriminations.

Figure 26:
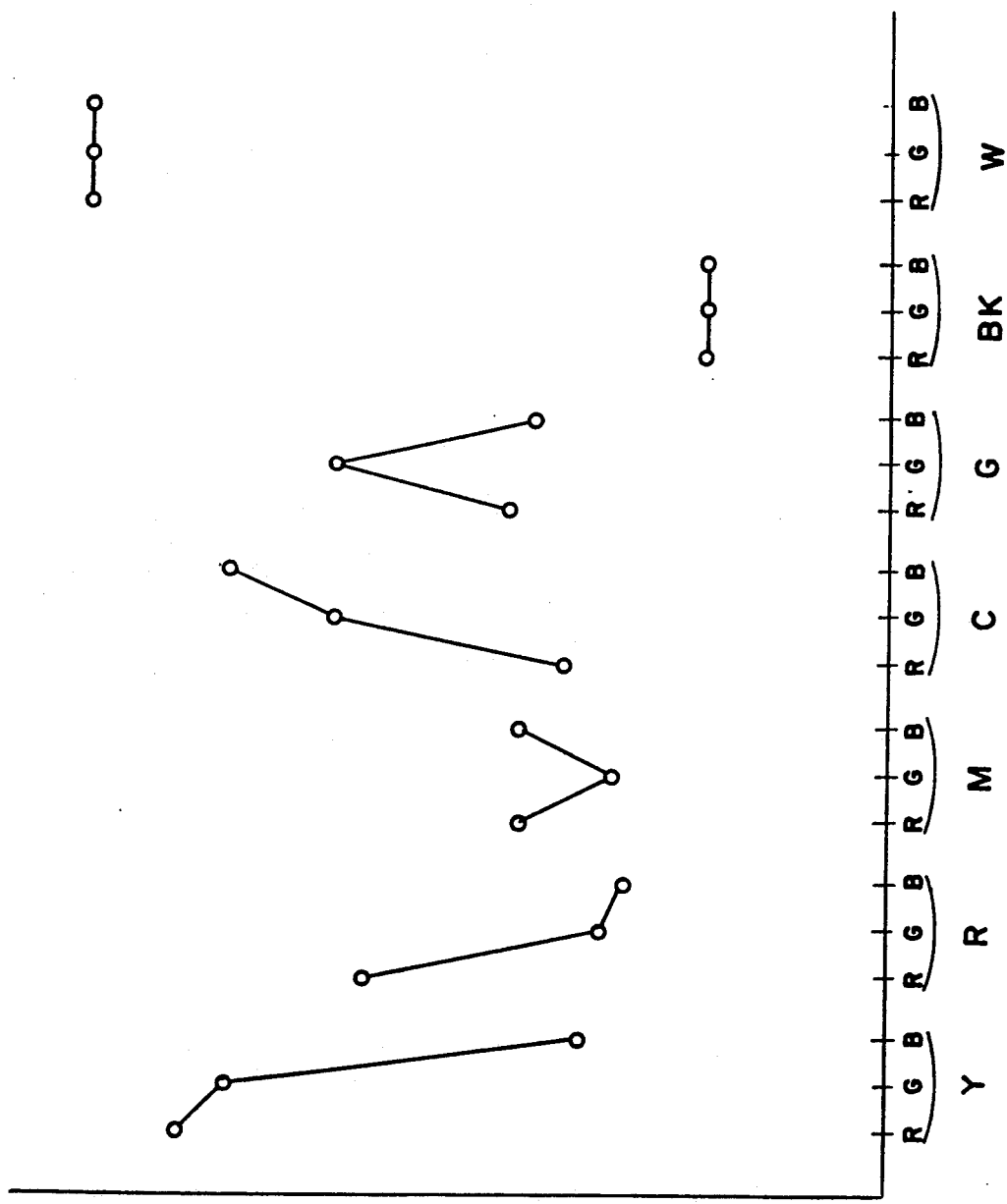
FIG. 26 is a graph showing outputs of the CCD array corresponding to seven colors.

Before entering an explanation about the error discriminating process, reasons why such error discriminations are caused will be explained at first. In FIG. 26, output R, G and B signals of each of seven colors having a standard brightness of color are shown, R and G components of the yellow color, R component of the red color and G and B components of the cyan color have high levels, respectively.

The color discriminating circuit 54 determines individual color data in the unit of reading using relative and absolute values of the output signals.

Figure 27:
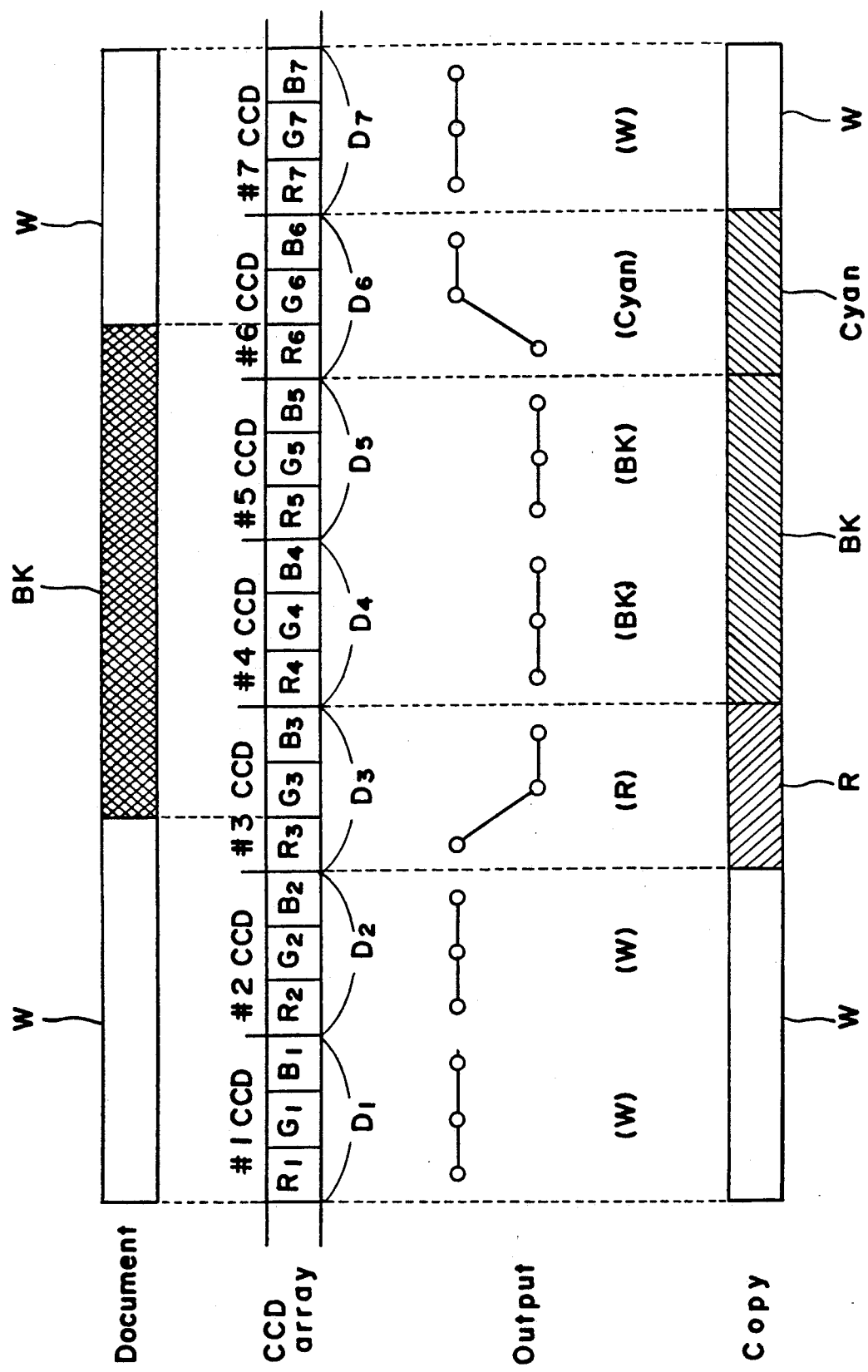
FIG. 27 is an explanatory view for showing error color data caused upon reading a document.

FIG. 27 shows an example of errors caused by the data discriminating circuit 54. The upper most line of FIG. 27 shows a portion of a certain line of a document to be read and the lower most line thereof shows the portion of a copy corresponding to the portion of the document.

The CCD array is shown every unit of reading below the portion of the document and output signals from the CCD array are shown between the CCD array and the portion of the corresponding line of the copy. As shown therein, #3CCD and #6CCD locates at boundaries from the white to black color and vice versa. Other CCDs of #1, #2, #4, #5 and #7 output normal output signals and, therefore, correct color data are obtained therefrom. However, with respect to #3CCD, the R3 thereof outputs a high signal corresponding to the white color but G3 and B3 output low signals corresponding to the black color, respectively. Due to these R3, G3 and B3 output signals, the color data obtained from #3CCD is decided as the red color not the black color. Also, the color data obtained from #6CCD is decided as the cyan color erroneously. These uncorrect color data result in uncorrect erasing data which worsens the quality of copy.

Figure 28:
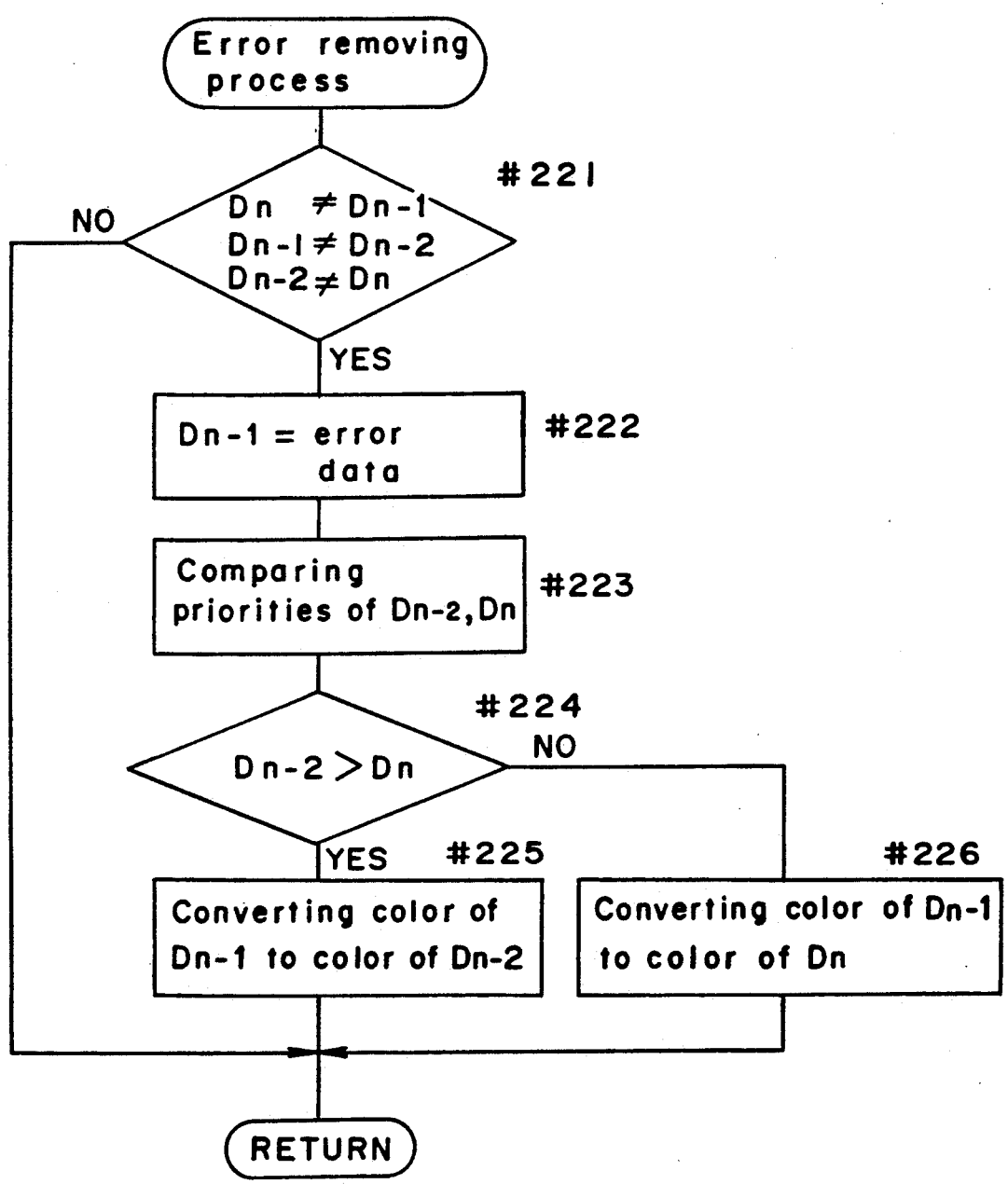
FIG. 28 is flow chart of an error removing process according to the second preferred embodiment of the present invention.

FIG. 28 shows a flow chart of the subroutine #203 of FIG. 25 for removing errors in the color discrimination.

In this flow chart, at first, successive three output data Dn-2, Dn-1 and Dn in the unit of reading each of which is comprised of R, G and B output signals are compared at step #221. If all output data do not coincide with each other, the process goes to step #222 and the middle data Dn-1 is decided as an error data since it is supposed with a high probability that a boundary between two colors locates at the area of #(n−1) CCD, as is easily understood from FIG. 27. Then, at step #223, ranks of priority of two colors discriminated from the output data Dn-2 and Dn are compared with each other. If the rank of priority of the color of the output data Dn-2 is higher than that of Dn at step #224, the color of Dn-1 is converted to the color of Dn-2 at step #225. If not, the color of Dn-1 is converted to the color of Dn at step #226. Since the erroneous color data is replaced by a color having a higher rank of priority, a natural color image can be realized.

Figure 30:
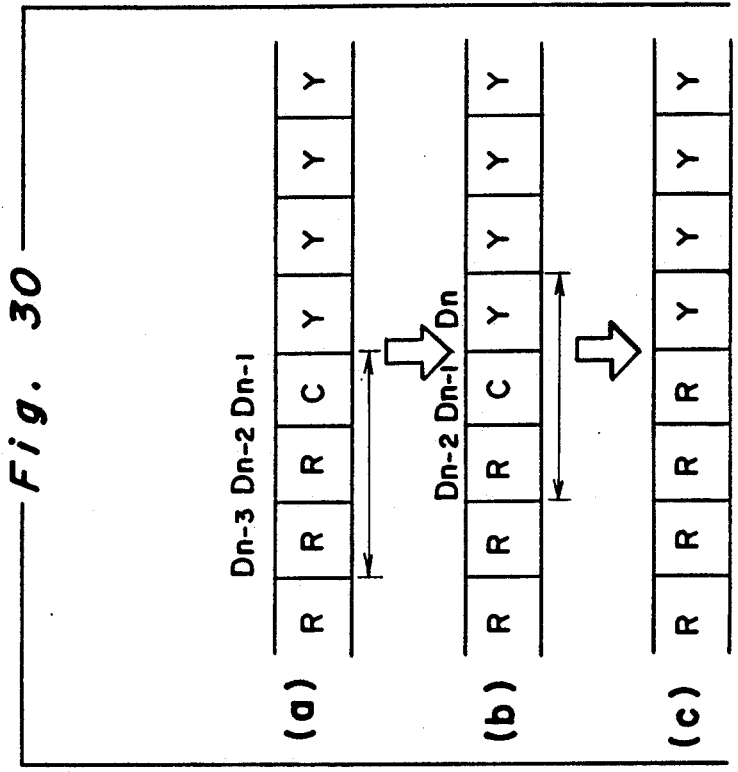
FIGS. 29 and 30 are examples of an error removing method according to the present invention.
Figure 29:
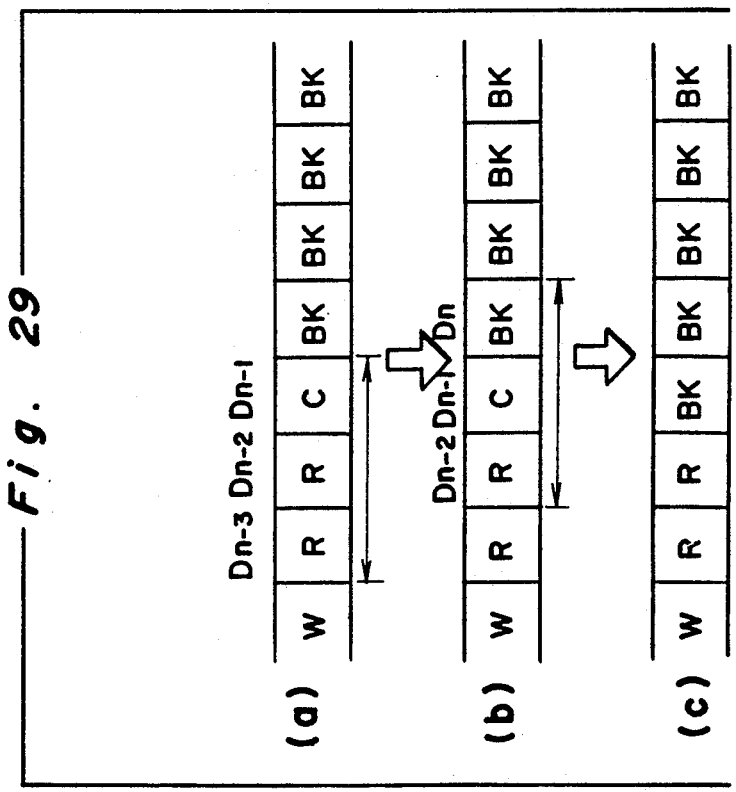

FIGS. 29 and 30 show examples of correction of error data.

In D(a) of FIG. 29, three output data Dn-3(R), Dn-2(R) and Dn-1(C) are compared but no error is decided since Dn-2=Dn-1. In (b) of FIG. 29, three output data Dn-2(R), Dn-1(C) and Dn(BK) are compared. In this case, all output data are different from each other and, therefore, the data Dn-1 is decided as an error data. And, it is converted to the black color since the black color (Dn) has a higher rank of priority than that of the red color (Dn-2).

In the example shown in FIG. 30, three output data Dn-2(R), Dn-1(C) and Dn(Y) are different from each other. In this case, the data Dn-1 is converted to the red color since the rank of priority of the red color is higher than that of the yellow color.

Figure 31:
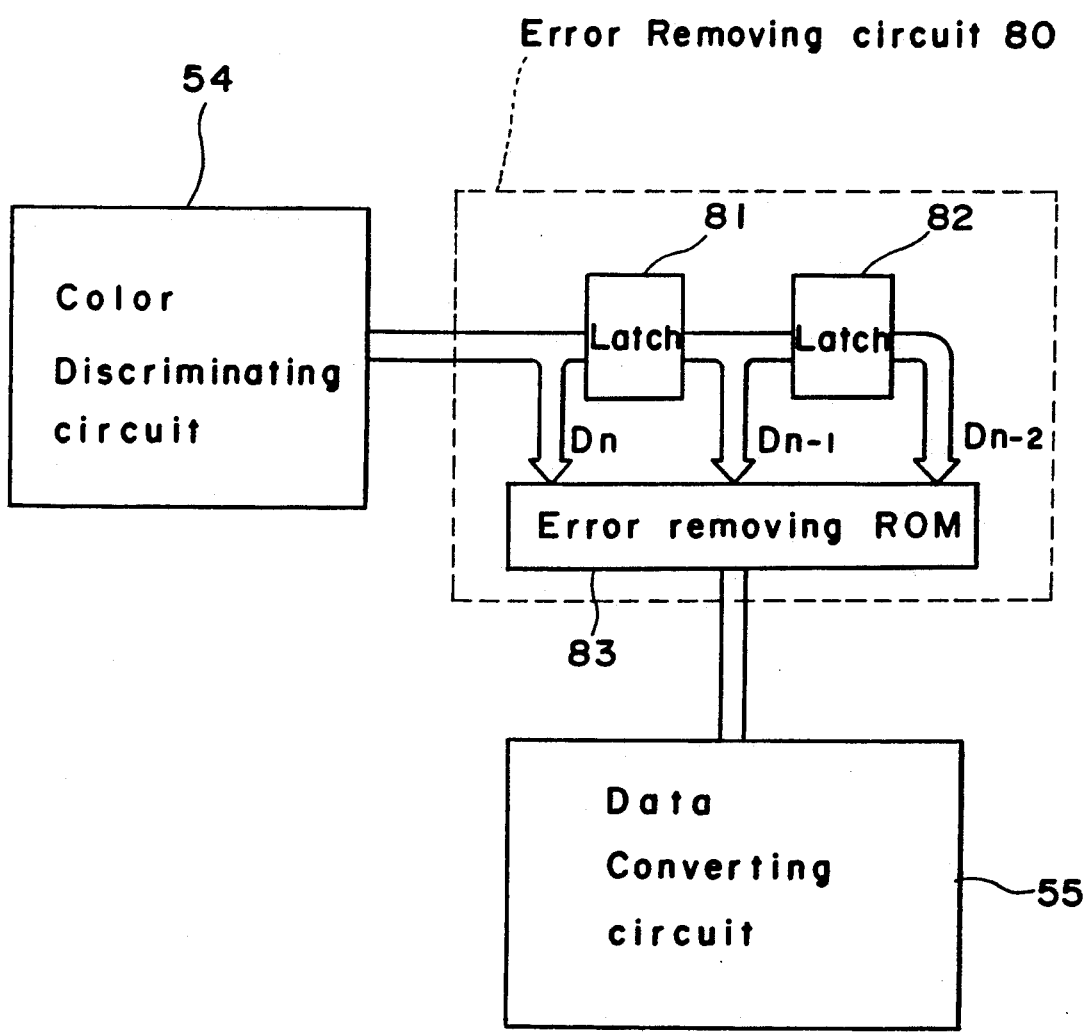
FIG. 31 is a block diagram of an error removing circuit according to the present invention.

In FIG. 31, a composition of the error removing circuit 80 is shown.

It is comprised of two latches 81 and 82 and an error removing ROM 83. Data Dn-2, Dn-1 and Dn inputted from the color discriminating circuit 54 are latched by respective latches 81 and 82, respectively and, then, inputted into the error removing ROM 83.

The error removing ROM 83 compares three data Dn-2, Dn-1 and D-n and, if all data are different from each other, the middle data Dn-1 is converted to either one of colors of Dn-2 and Dn by referring to a table regarding the ranks of priority of colors stored therein. The converted data is outputted to the data converting circuit 55.

It is understood that various other modifications will be apparent to and can be readily made by those skilled in the art without departing from the scope and spirit of the present invention. Accordingly, it is not intended that description as set forth herein, but rather that the claims be construed as encompassing all the features of patentable novelty that reside in the present invention, including all features that would be treated as equivalents thereof by those skilled in the art to which the present invention pertains.

What is claimed is:

1. A multicolor image forming apparatus in which a multi-toner image is formed through an image forming process comprised of:
    image reading means for reading a document image and decomposing said document image into individual colors to obtain color data thereof, wherein said image reading means is composed of an array of image reading elements aligned along a main scan direction;
    image forming means for forming a latent image corresponding to said document image by exposing a surface of a uniformly electrified photoconductive body with a light reflected from a document illuminated by a light source;
    erasing means for erasing portions of said latent image except for portions thereof to be developed according to said color data, wherein said erasing means is composed of an array of light emitting elements aligned along said main scan direction, each light emitting element being larger than each image reading element and a unit of erasing corresponds to plural units of reading;

developing means for developing said latent image using toner of a predetermined color;

transfer means for transferring a toner image formed on said surface of the photoconductive body onto an intermediate image transfer medium;

a conversion means for converting a plurality of color data which is obtained by said image reading means and corresponds to said unit of erasing to one color data to be processed by said erasing means according to a combination of colors included in said plurality of color data;

a control means for driving said erasing means according to said converted color data;

a second transfer means for transferring said toner image on said intermediate image transfer medium to copy paper; and a memory means for memorizing the color data converted by said conversion means and wherein said control means control said erasing means according to said color data read from said memory means.

2. A multicolor image forming apparatus in which a multi-toner image is formed through an image forming process comprised of:

image reading means for reading a document image and decomposing said document image into individual colors to obtain color data thereof, wherein said image reading means is composed of an array of image reading elements aligned along a main scan direction;

image forming means for forming a latent image corresponding to said document image by exposing a surface of a uniform electrified photoconductive body with a light reflected from a document illuminated by a light source;

erasing means for erasing portions of said latent image except for portions thereof to be developed according to said color data, wherein said erasing means is composed of an array of light emitting elements aligned along said main scan direction, each light emitting element being larger than each image reading element and a unit of erasing corresponds to plural units of reading;

developing means for developing said latent image using toner of a predetermined color;

transfer means for transferring a toner image formed on said surface of the photoconductive body onto an intermediate image transfer medium;

a conversion means for converting a plurality of color data which is obtained by said image reading means and corresponds to said unit of erasing to one color data to be processed by said erasing means according to a combination of colors included in said plurality of color data;

a control means for driving said erasing means according to said converted color data;

a second transfer means for transferring said toner image on said intermediate image transfer medium to copy paper; and a reconversion means for reconverting said color data converted by said conversion means in said unit of erasing according to a color distribution of a predetermined number of said color data, wherein said control means controls said erasing means according to said color data reconverted by said reconversion means.

3. Multicolor image forming apparatus as claimed in claim 2 further comprising;

a memory means for renewably storing said color data, wherein said conversion means enables said memory means to store said color data converted by said conversion means, said reconversion means enables said memory means to store said color data reconverted by said reconversion means and said control means controls the memory means according to said color data read from said memory means.

4. Multicolor image forming apparatus as claimed in claim 2, wherein said control means controls said erasing means so as to inactivate individual light emitting elements if said color data corresponding to said individual light emitting elements white data.

5. A multicolor image forming apparatus in which a multi-toner image is formed through an image forming process comprised of:

image reading means for reading a document image and decomposing said document image into individual colors to obtain color data thereof, wherein said image reading means is composed of an array of image reading elements aligned along a main scan direction;

image forming means for forming a latent image corresponding to said document image by exposing a surface of a uniformly electrified photoconductive body with a light reflected from a document illuminated by a light source;

erasing means for erasing portions of said latent image except for portions thereof to be developed according to said color data, wherein said erasing means is composed of an array of light emitting elements aligned along said main scan direction, each light emitting element being larger than each image reading element and a unit of erasing corresponds to plural units of reading;

developing means for developing said latent image using toner of a predetermined color;

transfer means for transferring a toner image formed on said surface of the photoconductive body onto an intermediate image transfer medium;

a conversion means for converting a plurality of color data which is obtained by said image reading means and corresponds to said unit of erasing to one color data to be processed by said erasing means according to a combination of colors included in said plurality of color data;

a control means for driving said erasing means according to said converted color data;

a second transfer means for transferring said toner image on said intermediate image transfer medium to copy paper; and a data correction means for checking an arrangement of said color data read by said image reading means to determine whether single color data of a third color is located between a series of color data of a first color and a series of color data of a second color, wherein said data correction means converts said color data to either of the first or second color if a third color is found.

6. A multicolor image forming apparatus in which a multicolor toner image is formed is comprised of:
- a reading means for reading a document image and for decomposing said document image into individual colors to obtain color data thereof, wherein said image reading means is composed of an array of image reading elements aligned along a main scan direction;
- image forming means for forming a latent image corresponding to said document image by exposing a surface of a uniformly electrified photoconductive body with light reflected from a document illuminated by a light source;
- an erasing means for erasing portions of said latent image except for portions thereof to be developed wherein said erasing means is composed of an array of light emitting elements aligned along said main scan direction, each light emitting element being larger than that of each image reading element and a unit of erasing corresponding to plural units of reading;
- developing means for developing said latent image containing a toner having a predetermined color which is chosen among plural developing units;
- a transfer means for transferring a toner image formed on the surface of the photoconductive body onto an intermediate image transfer medium;
- a conversion means for converting a plurality of color data obtained by said image reading means and corresponding to said unit of erasing to one color data to be processed by said erasing means according to a combination of colors included in the plurality of the color data, wherein each of the converted color data is composed of a number of plural bits corresponding to the number of plural developing units where each bit corresponding to one of said plural developing units to indicate whether or not individual light emitting elements of said erasing means are turned on;
- a control means for driving said erasing means according to the converted color data;
- a second transfer means for transferring said toner image on said intermediate image transfer medium to copy paper; and
- a memory means for memorizing the color data converted by said conversion means and wherein said control means controls said erasing means according to said color data read from said memory means.

7. A multicolor image forming apparatus in which a multicolor toner image is formed is comprised of:
- a reading means for reading a document image and for decomposing said document image into individual colors to obtain color data thereof, wherein said image reading means is composed of an array of image reading elements aligned along a main scan direction;
- image forming means for forming a latent image corresponding to said document image by exposing a surface of a uniformly electrified photoconductive body with light reflected from a document illuminated by a light source;
- an erasing means for erasing portions of said latent image except for portions thereof to be developed wherein said erasing means is composed of an array of light emitting elements aligned along said main scan direction, each light emitting element being larger than that of each image reading element and a unit of erasing corresponding to plural units of reading;
- developing means for developing said latent image containing a toner having a predetermined color which is chosen among plural developing units;
- a transfer means for transferring a toner image formed on the surface of the photoconductive body onto an intermediate image transfer medium;
- a conversion means for converting a plurality of color data obtained by said image reading means and corresponding to said unit of erasing to one color data to be processed by said erasing means according to a combination of colors included in the plurality of the color data, wherein each of the converted color data is composed of a number of plural bits corresponding to the number of plural developing units where each bit corresponding to one of said plural developing units to indicate whether or not individual light emitting elements of said erasing means are turned on;
- a control means for driving said erasing means according to the converted color data;
- a second transfer means for transferring said toner image on said intermediate image transfer medium to copy paper; and
- an evaluation means for evaluating all of said color data on one page of a document, said evaluation means outputs a signal for cancelling an image forming process when it is evaluated that said erasing means will erase the whole area of the document if said image forming is performed.

8. A method for forming a multicolor image comprising the steps of:
  (a) step for reading a document image by an image reading device and for decomposing said document image into individual colors to obtain first color data thereof;
  (b) step for converting a plurality of said first color data, which are included in a matrix-like block corresponding to a size of one erasing element, to a second color data according to a specified conversion method based on the combination of colors included in a plurality of said first color data, wherein said second color data is stored in a memory means;
  (c) step for forming a latent image corresponding to said document image on the surface of a uniformly electrified photoconductive body;
  (d) step for selectively erasing said latent image by an erasing array according to said second color data to thereby produce a partially erased latent image which is to be developed;
  (e) step for developing said partially erased latent image using toner having a predetermined color;
  (f) step for transferring a toner image formed on the surface of said photoconductive body onto an intermediate image transfer medium; and
  (g) step for repeating the above steps (a) to (g) at least one time and for transferring the multicolor toner image thus formed on said intermediate image transfer medium to a copy paper.

9. A multicolor image forming method comprising the steps of:
  (a) step for reading a document image by an image reading device and for decomposing said document image into individual colors to obtain first color data thereof;

(b) step for converting a plurality of said first color data, which are included in a matrix-like block corresponding to a size of one erasing element, to a second color data according to a specified conversion method, in which said conversion method converts the first color data to said second color data according to the following conditions:

if color data of a certain color other than white color is major, the major color is selected as said second color data;

if all color data is white, a predetermined color is selected as the second color data; and if two or more colors are contained, a certain color is decided as said second color data in a predetermined manner;

(c) step for forming a latent image corresponding to said document image on the surface of a uniformly electrified photoconductive body;

(d) step for selectively erasing said latent image by an erasing array according to said second color data to thereby produce a partially erased latent image which is to be developed;

(e) step for developing said partially erased latent image using toner having a predetermined color;

(f) step for transferring a toner image formed on the surface of said photoconductive body onto an intermediate image transfer medium; and (g) step for repeating the above steps (a) to (g) at least one time and for transferring the multicolor toner image thus formed on said intermediate image transfer medium to a copy paper.

10. A multicolor image forming method as claimed in claim 9, wherein said predetermined color is black.

11. A multicolor image forming method as claimed in claim 9, wherein said predetermined color is white.

12. A multicolor image forming method as claimed in claim 9, wherein said second color data is decided based on a priorities of individual colors given before hand.

13. A multicolor image forming method as claimed in claim 9, wherein if two or more colors are contained, a black color is selected as said second color data.

14. A multicolor image forming method comprising the steps of:

(a) step for reading a document image by an image reading device and for decomposing said document image into individual colors to obtain first color data thereof;

(b) step for converting a plurality of said first color data, which are included in a matrix-like block corresponding to a size of one erasing element, to a second color data corresponding to a specified conversion method in which said conversion method converts the first color data to the second color data according to the following conditions:

if all color data of a predetermined number is the same, their color is selected as said second color data; and if two or more colors exist in said color data of a predetermined number, a certain color is decided as the color data in said unit of erasing according to a predetermined manner;

(c) step for forming a latent image corresponding to said document image on the surface of a uniformly electrified photoconductive body;

(d) step for selectively erasing said latent image by an erasing array according to said second color data to thereby produce a partially erased latent image which is to be developed;

(e) step for developing said partially erased latent image using toner having a predetermined color;

(f) step for transferring a toner image formed on the surface of said photoconductive body onto an intermediate image transfer medium; and (g) step for repeating the above steps (a) to (g) at least one time and for transferring the multicolor toner image thus formed on said intermediate image transfer medium to a copy paper.

15. A multicolor image forming method as claimed in claim 14, in which said second color data is determined according to the following conditions:

if it is possible to decide a major color among two or more colors, the major color is decided as said second color data; and if it is impossible to decide a major color among two or more colors a color is decided as said second color data according to a predetermined manner.

16. A multicolor image forming method as claimed in claim 15, in which said predetermined manner is based on priorities of individual colors given beforehand.

17. A multicolor image forming method as claimed in claim 16, in which a color white has the lowest priority.

18. A multicolor image forming method as claimed in claim 16, in which a color black has the highest priority.

19. A multicolor image forming method comprising the steps of:

(a) step for reading a document image by an image reading device and for decomposing said document image into individual colors to obtain first color data thereof;

(b) step for converting a plurality of said first color data, which are included in a matrix-like block corresponding to a size of one erasing element, to a second color data in which said second color data is decided according to the following conditions:

if a color is a major color among said color data of a predetermined number, the major color is selected; and if it is impossible to decide a major color among the color data of a predetermined number, a black color is selected as said second color data;

(c) step for forming a latent image corresponding to said document image on the surface of a uniformly electrified photoconductive body;

(d) step for selectively erasing said latent image by an erasing array according to said second color data to thereby produce a partially erased latent image which is to be developed;

(e) step for developing said partially erased latent image using toner having a predetermined color;

(f) step for transferring a toner image formed on the surface of said photoconductive body onto an intermediate image transfer medium; and (g) step for repeating the above steps (a) to (g) at least one time and for transferring the multicolor toner image thus formed on said intermediate image transfer medium to a copy paper.

20. A multicolor image forming method as claimed in claim 19, in which if a white color is the major color, a secondary major color is selected as said color data in said unit of erasing.

* * * * *